US010582409B2

(12) United States Patent
Vajapeyam et al.

(10) Patent No.: US 10,582,409 B2
(45) Date of Patent: *Mar. 3, 2020

(54) RRM BASED ON SIGNAL STRENGTH MEASUREMENTS IN LTE OVER UNLICENSED SPECTRUM

(71) Applicant: QUALCOMM Incorporated, San Diego, CA (US)

(72) Inventors: Madhavan Srinivasan Vajapeyam, San Diego, CA (US); Aleksandar Damnjanovic, Del Mar, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,209

(22) Filed: Jun. 7, 2019

(65) Prior Publication Data

US 2019/0289486 A1 Sep. 19, 2019

Related U.S. Application Data

(63) Continuation of application No. 15/004,672, filed on Jan. 22, 2016, now Pat. No. 10,334,465.
(Continued)

(51) Int. Cl.
*G06F 11/00* (2006.01)
*H04W 24/10* (2009.01)
(Continued)

(52) U.S. Cl.
CPC ............. *H04W 24/10* (2013.01); *H04L 5/006* (2013.01); *H04L 5/0048* (2013.01);
(Continued)

(58) Field of Classification Search
CPC ............. H04W 76/048; H04W 72/085; H04W 72/0453; H04W 24/00; H04W 24/10;
(Continued)

(56) References Cited

U.S. PATENT DOCUMENTS 5,634,192 A    5/1997   Meche et al.
2010/0284303 A1  11/2010  Catovic et al.
(Continued)

OTHER PUBLICATIONS

3GPP TS 36.331: "3rd Generation Partnership Project, Technical Specification Group Radio Access Network, Evolved Universal Terrestrial Radio Access (E-UTRA), Radio Resource Control (RRC), Protocol specification (Release 12)", 3GPP Standard, 3rd Generation Partnership Project (3GPP), Mobile Competence Centre, 650, Route Des Lucioles, F-06921 Sophia-Anti Polis Cedex, France, vol. RAN WG2, No. V12.4.1, Jan. 7, 2015 (Jan. 7, 2015), pp. 1-410, XP050927575, 5.5 Measurements, 5.5.1 introduction, 5.5.2 Measurement Configuration, 5.5.3 Performing measurement, 5.5.3.1 General.
(Continued)

*Primary Examiner* — Mang Hang Yeung
(74) *Attorney, Agent, or Firm* — Nerrie M. Zohn

(57) ABSTRACT

UE-aided channel selection within unlicensed frequency bands. A base station may communicate with UEs using LTE/LTE-A carrier waveforms (e.g., configured as a secondary cell) in the unlicensed frequency band. The base station may configure UEs for wide-band interference feedback for channels in the unlicensed frequency band. The measurements of wide-band signal strength may be performed by the UEs on channels for which the base station is not currently transmitting, or during silent periods of a configured secondary cell. The UEs may feedback an average total received power over a measurement bandwidth for one or more frequency channels of the unlicensed frequency band. The base station may receive the wide-band signal
(Continued)

strength feedback from the UEs and identify potential frequency channels for channel selection for the secondary cell based on its own measurements of the candidate channels, and the wide-band signal strength feedback from the UEs.

47 Claims, 17 Drawing Sheets

Related U.S. Application Data

(60) Provisional application No. 62/109,921, filed on Jan. 30, 2015.

(51) Int. Cl.
*H04W 24/00* (2009.01)
*H04W 76/28* (2018.01)
*H04L 5/00* (2006.01)
*H04W 72/04* (2009.01)
*H04W 72/08* (2009.01)
*H04W 88/02* (2009.01)
*H04W 88/08* (2009.01)

(52) U.S. Cl.
CPC ....... *H04W 24/00* (2013.01); *H04W 72/0453* (2013.01); *H04W 72/085* (2013.01); *H04W 76/28* (2018.02); *H04W 88/02* (2013.01); *H04W 88/08* (2013.01)

(58) Field of Classification Search
CPC ...... H04W 88/02; H04W 88/08; H04L 5/006; H04L 5/0048
USPC ........................................................ 370/252
See application file for complete search history.

(56) References Cited

U.S. PATENT DOCUMENTS

| | | |
|---|---|---|
| 2011/0002307 A1 | 1/2011 | Mueller et al. |
| 2011/0110251 A1* | 5/2011 | Krishnamurthy ... H04W 72/082 370/252 |
| 2012/0115463 A1 | 5/2012 | Weng et al. |
| 2013/0121187 A1* | 5/2013 | Das ................... H04W 36/0083 370/252 |
| 2014/0341018 A1 | 11/2014 | Bhushan et al. |
| 2015/0195763 A1 | 7/2015 | Chen et al. |
| 2016/0227427 A1 | 8/2016 | Vajapeyam et al. |

OTHER PUBLICATIONS

International Search Report and Written Opinion—PCT/US2016/014737—ISA/EPO—Jun. 15, 2016.
Huawei, HiSilicon, Introducing CSI-RS based TP Identification and RSRP Measurement Requirement for SCE into TS36.133 [online], 3GPP TSG-RAN WG4#72bis R4-146011, URL: http://www.3gpp.org/ftp/tsg_ran/WG4_Radio/TSGR4_72Bis/Docs/R4-146011.zip, Oct. 6, 2014, 9 Pages.
HTC, Measurement and Synchronization for LAA-LTE [online], 3GPP TSG-RAN WG1#79 R1-144928, URL: http://www.3gpp.org/ftp/tsg_ran/WG1_RL1/TSGR1_79/Docs/R1-144928.zip, Nov. 17, 2014, 2 Pages.
Taiwan Search Report—TW105102253—TIPO—dated Sep. 24, 2019.

* cited by examiner

RRM BASED ON SIGNAL STRENGTH MEASUREMENTS IN LTE OVER UNLICENSED SPECTRUM

CROSS REFERENCES

The present Application for Patent is a continuation of U.S. patent application Ser. No. 15/004,672 by Vajapeyam, et al., entitled "RRM Based on Signal Strength Measurements in LTE Over Unlicensed Spectrum" filed Jan. 22, 2016, which claims priority to U.S. Provisional Patent Application No. 62/109,921 by Vajapeyam et al., entitled "LTE-U RRM Based On Silent Interference Measurements," filed Jan. 30, 2015, assigned to the assignee hereof, and expressly incorporated by reference herein.

BACKGROUND

Field of Disclosure

The following relates generally to wireless communication, and more specifically to radio resource management (RRM) based on silent interference measurements in LTE over unlicensed spectrum.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., an LTE system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

Wireless communication systems may employ various radio resource management (RRM) techniques. For example, spectrum resources may be assigned by fixed channel allocation (FCA) or dynamic frequency selection (DFS). Cellular networks tend to operate using FCA in licensed frequency bands. DFS may be applied in wireless networks with several adjacent non-centrally controlled access points or devices. DFS may be used by the access points or devices to select frequency channels with low interference levels. DFS is supported by various IEEE 802.11 wireless local area network (WLAN) protocols. DFS may also be mandated in certain frequency bands for avoidance of other transmissions (e.g., radar, etc.). Generally, the process of DFS may also be called channel selection.

With increasing data traffic in cellular networks that use a licensed radio frequency spectrum band, offloading of at least some data traffic to an unlicensed radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Use of an unlicensed radio frequency spectrum band may also provide service in areas where access to a licensed radio frequency spectrum band is unavailable. In some cases, the cellular network my utilize carrier waveforms similar to those used in the multiple access cellular communication system over the unlicensed spectrum. For example, networks may use LTE/LTE-A cells in unlicensed spectrum, which may be known as LTE-Unlicensed (LTE-U) operation. However, performing channel selection for LTE-U cells without causing or receiving substantial interference from other users of the unlicensed spectrum may present challenges.

SUMMARY

Systems, methods, and apparatuses for UE-aided channel selection within unlicensed frequency bands are described. A base station may communicate with UEs using LTE/LTE-A carrier waveforms (e.g., configured as a secondary cell) in an unlicensed frequency band. The base station may configure wide-band interference feedback by UEs served by the base station that may be configured for communication via the secondary cell. The wide-band interference measurements may be performed by the UEs on channels for which the base station is not currently transmitting (e.g., candidate channels for channel selection, etc.), or during signal strength measurement periods of the secondary cell. The UEs may feedback an average total received power over a measurement bandwidth for one or more frequency channels of the unlicensed frequency band. The base station may receive the wide-band interference feedback from the UEs and identify potential frequency channels for channel selection for the secondary cell based on its own measurements of the candidate channels, and the wide-band interference feedback from the UEs.

A method of wireless communication is described. The method may include identifying, at a user equipment (UE), a configuration for reporting measurements for channel selection assistance for at least one frequency channel to a base station, wherein the configuration comprises timing information indicating a plurality of signal strength measurement periods, performing wide-band measurements for the at least one of the at least one frequency channel according to the configuration during the plurality of signal strength measurement periods, filtering the wide-band measurements to obtain respective filtered wide-band received signal strength for the at least one of the at least one frequency channel and reporting the filtered wide-band received signal strength to the base station.

An apparatus for wireless communication is described. The apparatus may include means for identifying, at a user equipment (UE), a configuration for reporting measurements for channel selection assistance for at least one frequency channel to a base station, wherein the configuration comprises timing information indicating a plurality of signal strength measurement periods for which the base station may suppress transmission on at least one of the at least one frequency channel, means for performing wide-band measurements for the at least one frequency channel according to the configuration, means for filtering the wide-band measurements to obtain respective filtered wide-band received signal strength for the at least one of the at least one frequency channel and means for reporting the filtered wide-band received signal strength to the base station.

A further apparatus is described. The apparatus may include a processor, memory in electronic communication with the processor, and instructions stored in the memory. The instructions may be operable to cause the processor to identify, at a user equipment (UE), a configuration for reporting measurements for channel selection assistance for at least one of frequency channel to a base station, wherein the configuration comprises timing information indicating a plurality of signal strength measurement periods, perform wide-band measurements for the at least one frequency channel according to the configuration during the plurality of signal strength measurement periods, filter the wide-band measurements to obtain respective filtered wide-band received signal strength for the at least one frequency channel and report the filtered wide-band received signal strength to the base station.

A non-transitory computer readable medium for wireless communication is described. The non-transitory computer-readable medium may include instructions to cause a processor to identify, at a user equipment (UE), a configuration for reporting measurements for channel selection assistance for a set of frequency channels to a base station, where the configuration comprises timing information indicating a plurality of signal strength measurement periods for which the base station suppresses transmission on at least one of the set of frequency channels, perform wide-band measurements for the at least one of the set of frequency channels according to the configuration, filter the wide-band measurements to obtain respective filtered wide-band received signal strength for the at least one of the set of frequency channels and report the filtered wide-band received signal strength to the base station.

Some examples of the method, apparatus, or non-transitory computer-readable medium described above may further include processes, features, means, or instructions for identifying the plurality of signal strength measurement periods based on the timing information, where the timing information comprises one or more of a discontinuous reception (DRX) cycle for the UE, a measurement timing configuration indicating timing for the plurality of signal strength measurement periods, or a discovery reference signal (DRS) configuration for a cell.

In some examples of the method, apparatus, or non-transitory computer-readable medium described above, the performing the wide-band measurements for the at least one or more frequency channels comprises measuring one or more of a total power received across a bandwidth of a serving cell for the plurality of signal strength measurement periods, or a total power received across a bandwidth of a candidate frequency channel of the set of frequency channels not currently used for communication by the base station.

Some examples of the method, apparatus, or non-transitory computer-readable medium described above may further include processes, features, means, or instructions for identifying a reporting event triggering the reporting the filtered wide-band received signal strength to the base station. In some examples of the method, apparatus, or non-transitory computer-readable medium described above, the reporting event comprises one or more of a wide-band received signal strength measurement for a serving cell of the base station being greater than a first threshold, the wide-band received signal strength measurement for the serving cell being less than a second threshold, a wide-band received signal strength measurement for a candidate frequency channel of the set of frequency channels not currently used for communication by the base station being less than a third threshold, or the wide-band received signal strength measurement for the candidate frequency channel plus an offset being less than the wide-band received signal strength measurement for the serving cell.

In some examples of the method, apparatus, or non-transitory computer-readable medium described above, the reporting the filtered wide-band received signal strength comprises periodically reporting the filtered wide-band received signal strength according to a channel selection assistance reporting period.

In some examples of the method, apparatus, or non-transitory computer-readable medium described above, the set of frequency channels include at least one candidate frequency channel not currently used for communication by the base station.

In some examples of the method, apparatus, or non-transitory computer-readable medium described above, the set of frequency channels comprise channels of an unlicensed frequency band.

A method of wireless communication is described. The method may include configuring, by a base station, at least one UE for reporting measurements for channel selection assistance for at least one frequency channel, wherein the configuring comprises sending timing information indicating a plurality of signal strength measurement periods for which the base station suppresses transmission on at least one frequency channel, receiving, from the at least one UE, UE wide-band received signal strength information measured according to the timing information, determining base station wide-band signal strength information by measuring signal strength for the at least one frequency channel and identifying a frequency channel for a secondary cell of the base station based at least in part on the base station wide-band received signal strength information and the UE received signal strength interference information.

An apparatus for wireless communication is described. The apparatus may include means for configuring, by a base station, at least one UE for reporting measurements for channel selection assistance for at least one frequency channel, wherein the configuring comprises sending timing information indicating a plurality of signal strength measurement periods for which the base station suppresses transmission on at least frequency channel, means for receiving, from the at least one UE, UE wide-band received signal strength information measured according to the timing information, means for determining base station wide-band signal strength information by measuring signal strength for the at least one frequency channel and means for identifying a frequency channel for a secondary cell of the base station based at least in part on the base station wide-band received signal strength information and the UE received signal strength interference information.

A further apparatus is described. The apparatus may include a processor, memory in electronic communication with the processor, and instructions stored in the memory. The instructions may be operable to cause the processor to configure, by a base station, at least one UE for reporting measurements for channel selection assistance for at least one frequency channel, wherein the configuring comprises sending timing information indicating a plurality of signal strength measurement periods for which the base station suppresses transmission on at least one frequency channel, receive, from the at least one UE, UE wide-band received signal strength information measured according to the timing information, determine base station wide-band signal strength information by measuring signal strength for the at least one frequency channel and identify a frequency channel for a secondary cell of the base station based at least in part on the base station wide-band received signal strength information and the UE received signal strength interference information.

A non-transitory computer readable medium for wireless communication is described. The non-transitory computer-readable medium may include instructions to cause a processor to configure, by a base station, at least one UE for reporting measurements for channel selection assistance for a set of frequency channels, where the configuring comprises sending timing information indicating a plurality of signal strength measurement periods for which the base station suppresses transmission on at least one of the set of frequency channels, receive, from the at least one UE, UE wide-band received signal strength information measured according to the timing information, determine base station wide-band signal strength information by measuring signal strength for the set of frequency channels and identify a frequency channel for a secondary cell of the base station based on the base station wide-band received signal strength information and the UE received signal strength interference information.

Some examples of the method, apparatus, or non-transitory computer-readable medium described above may further include processes, features, means, or instructions for silencing transmission on the at least one of the set of frequency channels for the plurality of signal strength measurement periods.

In some examples of the method, apparatus, or non-transitory computer-readable medium described above, the timing information comprises one or more of a DRX cycle for the at least one UE, a measurement timing configuration indicating timing for the plurality of signal strength measurement periods for the at least one frequency channel, or a discovery reference signal (DRS) configuration for the at least frequency channel.

In some examples of the method, apparatus, or non-transitory computer-readable medium described above, the configuring the at least one UE comprises sending, to the at least one UE, any of frequency information identifying a candidate frequency channel of the unlicensed frequency band not currently used for communication by the base station, a wide-band received signal strength reporting period, a filter coefficient for filtering measured wide-band received signal strength to obtain filtered wide-band received signal strength, or combinations thereof.

In some examples of the method, apparatus, or non-transitory computer-readable medium described above, the at least one UE comprises a set of UEs being served by a primary cell of the base station, and where the identifying the frequency channel for the secondary cell comprises determining a frequency channel having a lowest combined interference level based on the base station wide-band received signal strength information and the received UE wide-band received signal strength information.

In some examples of the method, apparatus, or non-transitory computer-readable medium described above, the one or more frequency channels include at least one candidate frequency channel of the unlicensed frequency band not currently used for communication by the base station. In some examples of the method, apparatus, or non-transitory computer-readable medium described above, the set of frequency channels comprise channels of an unlicensed frequency band.

The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
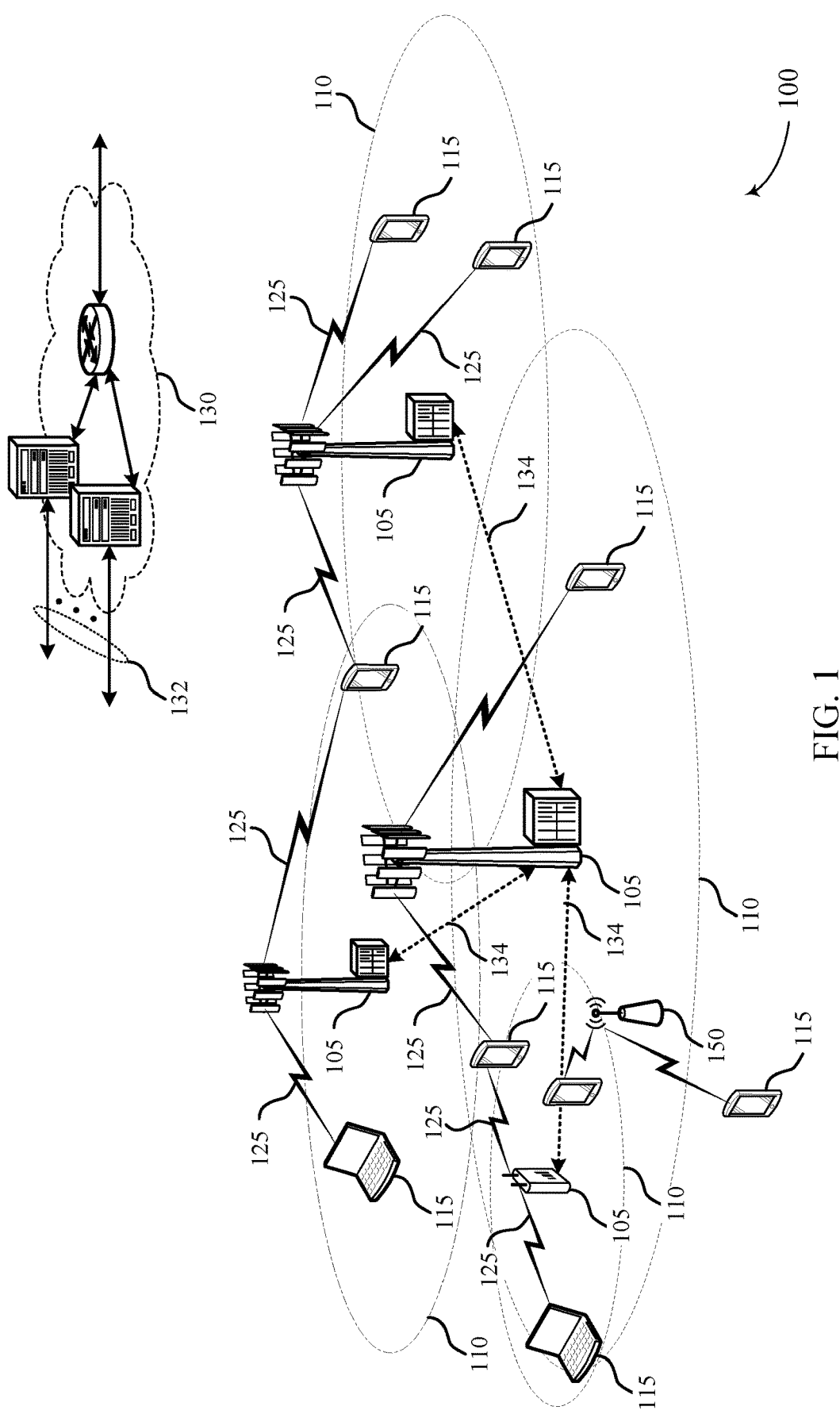
FIG. 1 illustrates an example of a wireless communications system in accordance with various aspects of the present disclosure.

Systems, method, or apparatuses are described for UE-aided channel selection within unlicensed frequency bands. Several unlicensed frequency bands support multi-channel operation using dynamic frequency selection (DFS) or channel selection. For example, the 5 GHz band is considered for operating according to LTE-based protocols (which may be called LTE-Unlicensed (LTE-U)). Performing channel selection effectively may be a key enabler for coexistence of LTE/LTE-A technologies with other radio access technologies (RATs) in unlicensed frequency bands. Suitable channel selection techniques may enable an LTE-U base station (e.g., a base station using LTE-based protocols for communication via unlicensed spectrum or a base station using LTE-based protocols for communication via both unlicensed and licensed spectrum) to avoid receiving/causing interference to other LTE-U base stations or devices, or devices employing other RATs (e.g., Wi-Fi) using the same band. Channel selection based only on measurements made at the base station may not be sufficient for best performance and coexistence using channel selection. For example, interference conditions at UEs served by the base station may be quite different than what is seen by the base station itself. In some instances, nodes close to the served UEs may cause low interference to the base station while significantly impacting UE transmission or reception.

UE-aided channel selection includes configuring served UEs to provide measurements of interference conditions at the UE, which the base station 105 can take into account in performing channel selection. For example, if most served UEs report low interference on particular channels, the base station may select or re-select secondary cells to those channels. The current feedback scheme for LTE/LTE-A cells is directed to determining cells that are strongest based on received signal received power (RSRP) or reference signal receive quality (RSRQ), which provide indications of strength or quality of a signal transmitted by the base station. However, RSRP/RSRQ based measurements may not be suitable for channel selection in LTE-U as they require the LTE-U cell to transmit on the channel. Transmission of a signal for RSRP/RSRQ measurements may disturb the interference condition. For example, other nodes may backoff when sensing such transmission and the channel may appear "clearer" than it really would be without transmission by the base station on the channel.

Described embodiments include reporting feedback from UEs including an interference metric for the plurality of signal strength measurement periods of a serving cell or other candidate channels of the unlicensed frequency band on which the UE is not currently configured to communicate. The interference metric may include an indication of a wide-band interference (e.g., received signal strength indicator (RSSI), etc.) for channels of the unlicensed frequency band. The wide-band interference may be measured over frequency resources spanning the frequency channel and may be measured over a subset or all symbols for a measurement period (e.g., a subframe, etc.). Alternatively, a subset of resources of a cell may be silenced by the base station (e.g., muted CSI-RS resources) and the wide-band interference may be measured over the silenced resources. The base station may configure the UE with measurement timing information that indicates the plurality of signal strength measurement periods. The measurement timing information may include a discontinuous reception (DRX) cycle for the UE, a discovery reference signal (DRS) timing for the cell, or a measurement timing configuration for which the base station will silence transmission. The base station silences transmission (e.g., does not transmit on any resources on the channel) during the plurality of signal strength measurement periods, receives the indications of wide-band interference for the frequency channels seen by the UEs, and identifies channels for selection or re-selection of secondary cells based on its own measurements and the reported wide-band interference information.

In some cases, the measurement timing configurations may include an RSSI measurement timing configuration (RMTC) or a DRS occasion configuration. The DRS occasion configuration may include a DRS measurement timing configuration (DMTC) window as well as indicate when the DRS will be transmitted. The RMTC and/or the DRS occasion configuration may apply to a configured secondary cell or a candidate frequency (e.g., non-configured frequency channel, etc.). In some cases, the RMTC may include configuration parameters for measuring and reporting average received power (e.g., RSSI) and/or channel occupancy (e.g., a percentage of measurement samples for which the RSSI may be above a threshold) in a reporting interval.

UEs may perform periodic wide-band interference measurements for one or more frequency channels of the unlicensed frequency band, filter the measurements, and feedback an indication (e.g., RSSI, etc.) of the filtered interference. Reporting for wide-band interference measurements may be periodic, aperiodic, or may be triggered by reporting triggers. For example, reporting may be triggered when a wide-band interference measurement for a secondary cell is less than a first threshold, the wide-band interference measurement for the secondary cell is greater than a second threshold, a wide-band interference measurement for a candidate frequency channel is less than a third threshold, a wide-band interference measurements for a candidate frequency channel plus an offset is less than the wide-band interference measurement for the secondary cell, the wide-band interference for the secondary cell becomes higher than a threshold and a candidate channel is simultaneously better than another (e.g., lower) threshold, and the like.

The following description provides examples, and is not limiting of the scope, applicability, or examples set forth in the claims. Changes may be made in the function and arrangement of elements discussed without departing from the scope of the disclosure. Various examples may omit, substitute, or add various procedures or devices as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The wireless communications system 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, the wireless communications system 100 is an LTE/LTE-Advanced (LTE-A) network. In LTE/LTE-A networks, the term evolved node B (eNB) may be generally used to describe the base stations 105, while the term UE may be generally used to describe the UEs 115. A network may include base stations 105 of different types (e.g., power classes, etc.) to provide service in different environments. A macro cell generally covers a relatively large geographic area (e.g., several kilometers in radius) and may allow unrestricted access by UEs 115 with service subscriptions with the network provider. In some cases, a wireless communications network 100 may include small cells whose coverage areas may overlap the coverage area of one or more macro base stations. A small cell is a lower-powered base station, as compared with a macro cell, that may operate in the same or different (e.g., licensed, unlicensed, etc.) frequency bands as macro cells. In some cases, small cells may be added in areas with high user demand or in areas not sufficiently covered by a macro base station. For example, a small cell may be located in a shopping center, or in an area where signal transmissions are blocked by terrain or buildings. A network that includes both large and small cells may be known as a heterogeneous network. In some cases, small cells may improve network performance by allowing macro base stations to offload traffic when load is high. Small cells may also include Home eNBs (HeNBs) which may provide service to a restricted group known as a closed subscriber group (CSG). For example, an office building may contain small cells for use only by the occupants of the building. In some cases, heterogeneous networks may involve more complex network planning and interference mitigation techniques than homogenous networks. The term "cell" is a 3GPP term that can be used to describe a base station, a carrier or component carrier associated with a base station, or a coverage area (e.g., sector, etc.) of a carrier or base station, depending on context. An eNB 105 or small cell 105 may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc.

LTE systems may utilize orthogonal frequency division multiple access (OFDMA) on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some examples of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a CC, a layer, a channel, etc. The term "component carrier" may refer to each of the multiple carriers utilized by a UE in carrier aggregation (CA) operation, and may be distinct from other portions of system bandwidth. For instance, a component carrier may be a relatively narrow-bandwidth carrier susceptible of being utilized independently or in combination with other component carriers. Each carrier may be used to transmit control information (e.g., reference signals, control channels, etc.), overhead information, data, etc. Multiple component carriers may be aggregated or utilized concurrently to provide some UEs 115 with greater bandwidth and, e.g., higher data rates. Each component carrier may provide the same capabilities as an isolated carrier based on release 8 or release 9 of the LTE standard. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A carrier used for DL may be referred to as a DL CC, and a carrier used for UL may be referred to as an UL CC. A UE 115 may be configured with multiple DL CCs and one or more UL CCs for carrier aggregation. Additionally or alternatively, carrier aggregation may be used with TDD component carriers.

A UE 115 may communicate with a single base station 105 utilizing multiple carriers, and may also communicate with multiple base stations simultaneously on different carriers. Each cell of a base station 105 may include a DL CC, a TDD UL-DL CC, or a DL CC and an UL CC. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). The PCell may serve as the RRC connection interface for the UE 115. Certain uplink control information (UCI), e.g., acknowledgement (ACK)/NACK, channel quality indicator (CQI), and scheduling information transmitted on physical uplink control channel (PUCCH), may be carried by the PCell. Additional carriers may be designated as secondary carriers, or secondary component carriers (SCC), which may be served by secondary cells (SCells). Secondary cells may be semi-statically configured on a per-UE basis. In some cases, secondary cells may not include or be configured to transmit the same control information as the primary cell.

Data may be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, DTCH for dedicated UE data, and multicast traffic channel (MTCH), for multicast data. DL transport channels may include broadcast channel (BCH) for broadcast information, a downlink shared channel (DL-SCH) for data transfer, paging channel (PCH) for paging information, and multicast channel (MCH) for multicast transmissions. UL transport channels may include random access channel (RACH) for access and uplink shared channel (UL-SCH) for data. DL physical channels may include physical broadcast channel (PBCH) for broadcast information, physical control format indicator channel (PCFICH) for control format information, physical downlink control channel (PDCCH) for control and scheduling information, physical HARQ indicator channel (PHICH) for HARQ status messages, physical downlink shared channel (PDSCH) for user data and physical multicast channel (PMCH) for multicast data. UL physical channels may include physical random access channel (PRACH) for access messages, physical uplink control channel (PUCCH) for control data, and physical uplink shared channel (PUSCH) for user data.

A base station 105 may provide a UE 115 with a measurement reporting configuration as part of an RRC configuration. The measurement reporting configuration may include parameters related to which neighbor cells and frequencies the UE 115 should measure, intervals for measuring frequencies other than a serving cell (e.g., measurement gaps), criteria for sending measurement reports, intervals for transmission of measurement reports, and other related information. In some cases, measurement reports may be triggered by events related to the channel conditions of the serving cells or the neighbor cells. For example, in an LTE system a first report (A1) may be triggered when the serving cell becomes better than a threshold; a second report (A2) when the serving cell becomes worse than a threshold; a third report (A3) when a neighbor cell becomes better than the primary serving cell by an offset value; a fourth report (A4) when a neighbor cell becomes better than a threshold; a fifth report (A5) when the primary serving cell becomes worse than a threshold and a neighbor cell is simultaneously better than another (e.g., higher) threshold; a sixth report (A6) when a neighbor cell becomes better than a secondary serving cell by an offset value; a seventh report (B1) when a neighbor using a different radio access technology (RAT) becomes better than a threshold; and an eighth report (B2) when a primary serving cell becomes worse than a threshold and the inter-RAT neighbor becomes better than another threshold. In some cases, the UE 115 may wait for a timer interval known as time-to-trigger (TTT) to verify that the trigger condition persists before sending the report. Other reports may be sent periodically instead of being based on a trigger condition (e.g., every two seconds a UE 115 may transmit an indication of a transport block error rate).

A base station 105 may insert periodic pilot symbols such as cell-specific reference signals (CRS) to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the coverage area 110 of the base station 105, demodulation reference signal (DMRS) may be directed toward specific UEs 115 and may be transmitted only on resource blocks assigned to those UEs 115. DMRS may include signals on 6 resource elements in each resource block in which they are transmitted. In some cases, two sets of DMRS may be transmitted in adjoining resource elements. In some cases, additional reference signals known as channel state information reference signals (CSI-RS) may be included to aid in generating channel state information (CSI). A subset of CSI-RS resources may be designated as interference management resources (IMR) and may be used for coordinated interference management between base stations, which may be known as coordinated multi-point (CoMP) operation. On the UL, a UE 115 may transmit a combination of periodic sounding reference signal (SRS) and UL DMRS for link adaptation and demodulation, respectively.

Coverage areas for LTE/LTE-A networks may overlap with other networks including networks using unlicensed spectrum. For example, a Wi-Fi access point 150 may be connected with devices (e.g., UEs 115, etc.) using links over unlicensed frequency bands. Other types of equipment may utilize the unlicensed frequency bands for other purposes (e.g., radar, etc.).

The base stations 105 and UEs 115 may also be configured to operate in unlicensed frequency bands using LTE/LTE-A carrier types, which may be called LTE-Unlicensed (LTE-U) operation. As described above, the protocols for unlicensed frequency bands may call for RRM techniques such as DFS to allocate bandwidth and communication channels to different devices using the band while limiting co-channel interference and adjacent channel interference among nearby devices sharing the unlicensed band. Unlicensed frequency bands may be divided into channels assigned to particular frequency ranges within the unlicensed frequency band. For example, the 5 GHz unlicensed band in the United States is divided into channels of 20 MHz or 40 MHz each, with additional limitations placed on various channels including DFS mandated for various channels. The process for performing DFS to limit interference co-channel interference and adjacent channel interference among nearby devices operating in the unlicensed frequency band may be called channel selection. By suitable channel selection, an LTE-U base station 105 may able to avoid receiving/causing excessive interference with respect to other LTE-U devices or other RATs (e.g., Wi-Fi, etc.) using the same band.

To perform channel selection, a base station 105 may perform measurements of interference on channels within the frequency band to find a suitable channel for limiting co-channel and adjacent channel interference to other devices. However, channel selection purely based on measurements may not be sufficient for best performance and coexistence practices. In some cases, interference conditions at UEs served by the base station 105 may be quite different than what is seen in the interference measurements taken at the base station 105. For example, nodes close to UEs served by the base station 105 may cause much lower detectable interference at the base station 105 while having a larger impact to the served UEs.

As described above, in current LTE/LTE-A systems UEs 115 feedback signal measurements to report signal conditions for cells served by the base station 105. For example, UEs 115 generally report RSRP or RSRQ measurements of the serving cells of the base station 105. However, RSRP/RSRQ based measurements may not be suitable for channel selection in LTE-U as they require the LTE-U cell to transmit on the channel. Transmitting on the channel for RSRP/RSRQ feedback may in itself disturb the interference condition. For example, other nodes may backoff when sensing such transmission and the channel may appear "clearer" than it really would be. In addition, RSRP/RSRQ based measurements are only supported on serving cells and therefore do not provide information related to channels of the unlicensed frequency band for which the base station 105 is not currently transmitting.

In embodiments, the different aspects of wireless communication system 100, such as the eNBs 105 and UEs 115, may be configured to perform UE-aided channel selection in unlicensed frequency bands. A base station 105 may configure wide-band interference feedback by UEs 115 served by the base station that may be configured for a secondary cell in the unlicensed frequency band. The wide-band interference measurements may be performed by the UEs on channels for which the base station 105 is not currently transmitting (e.g., candidate channels for channel selection, etc.), or during silent periods of a secondary cell of the base station 105. The UEs 115 may feedback a wide-band interference metric (e.g., an average total received power over a measurement bandwidth or channel occupancy) for one or more frequency channels of the unlicensed frequency band. The base station 105 may receive the wide-band interference feedback from the UEs 115 and identify potential frequency channels for channel selection for the secondary cell based on its own measurements of the candidate channels, and the wide-band interference feedback from the UEs 115.

Figure 2:
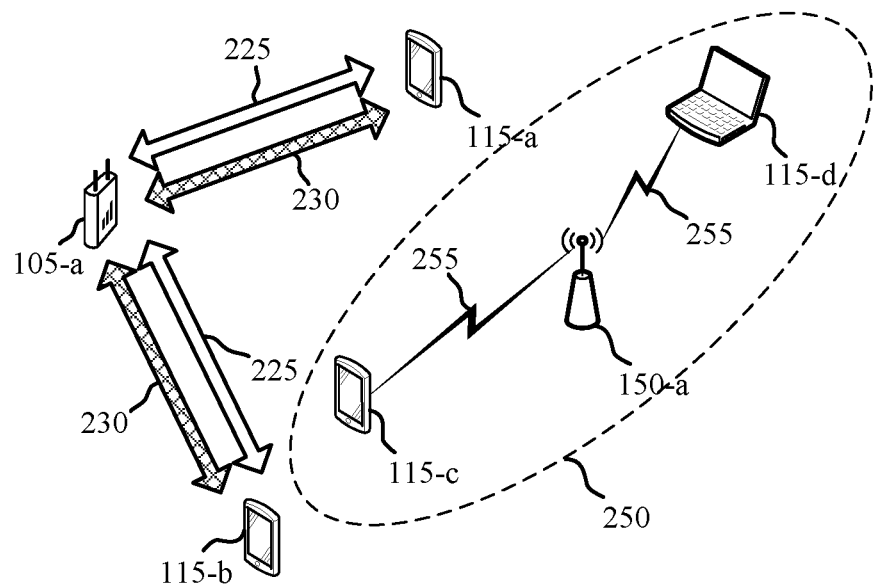
FIG. 2 illustrates an example of a wireless communications environment in accordance with various aspects of the present disclosure.

FIG. 2 illustrates an example of a wireless communications environment 200 in accordance with various aspects of the present disclosure. Wireless communications environment 200 may include a base station 105-a, which may be an example of a base station 105 described herein with reference to FIG. 1. In some examples, base station 105-a is a small cell base station. Wireless communications environment 200 may include UEs 115-a and 115-b served by base station 105-a, which may be examples of UEs 115 described herein with reference to FIG. 1. Wireless communications environment 200 may also include WLAN access point 150-a, which may be in communication using wireless links 255 with UEs 115-c and 115-d. WLAN access point 150-a and UEs 115-c and 115-d may be a part of basic service set (BSS) 250. BSS 250 may be operating in frequency channels of an unlicensed frequency band. Wireless communications environment 200 may include additional UEs 115, which may be served by base station 105-a, be part of BSS 250, or have other wireless links.

The base station 105-a may communicate with UEs 115-a and 115-b over a primary cell 225, which may be in a frequency band licensed to the network operator associated with the base station 105-a. To provide flexible and efficient use of frequency resources, base station 105-a and UEs 115-a 115-b may be configured to operate in the unlicensed frequency band (e.g., the same band used by WLAN access point 150-a) using LTE/LTE-A carrier waveforms (e.g., LTE-U). To utilize channels of the unlicensed frequency band, the base station 105-a may perform channel selection to assign a secondary cell 230 to one or more channels of the unlicensed frequency band.

To perform channel selection for secondary cell 230, the base station 105-a may perform measurements of interference on channels of the unlicensed frequency band. However, the interference conditions may not be consistent across the wireless communications environment 200. For example, the WLAN access point 150-a and UEs 115-c and 115-d may be using one or more channels of the unlicensed frequency band without causing significant interference as measured by the base station 105-a. If the base station 105-a selects a channel of the unlicensed frequency band for secondary cell 230 that is also being used by BSS 250, communications between the base station 105-a and UEs 115-a or 115-b may be subject to significant interference, or transmissions by base station 105-a over the channel may force devices of BSS 250 to backoff from transmitting or re-select to other channels, which is not an efficient or desired coexistence behavior in the unlicensed frequency band.

The base station 105-a may configure the UEs 115-a and 115-b for wide-band interference feedback for frequency channels of the unlicensed frequency band. The base station 105-a may configure the UEs 115-a and 115-b to perform wide-band interference measurements on channels for which the base station 105 is not currently transmitting (e.g., candidate channels for channel selection, etc.), or during silent periods of secondary cell 230. The UEs may feedback an interference metric (e.g., average total received power over a measurement bandwidth) for the configured frequency channels of the unlicensed frequency band. The base station 105-a may receive the wide-band interference feedback from the UEs 115 and identify potential frequency channels for channel selection for secondary cell 230 based on its own measurements of the current channel for secondary cell 230 and candidate channels, and the wide-band interference feedback from the UEs.

Figure 3:
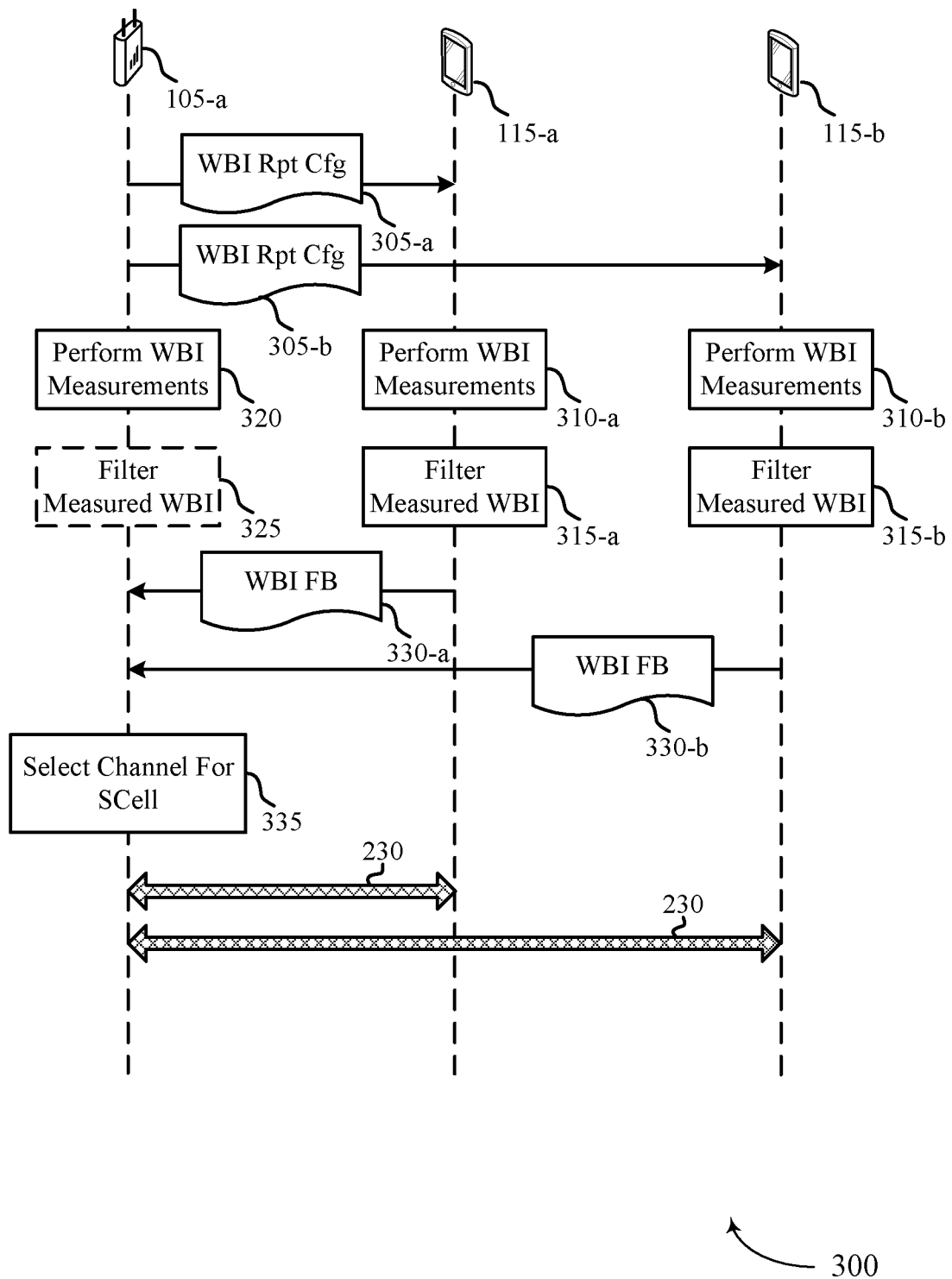
FIG. 3 shows an example process flow for UE-aided channel selection in accordance with various aspects of the present disclosure.

FIG. 3 shows an example process flow 300 for UE-aided channel selection in accordance with various aspects of the present disclosure. Process flow 300 may illustrate, for example, a process flow for selecting or re-selecting a frequency channel of an unlicensed frequency band for a secondary cell based on wide-band interference measurements from UEs 115-a and 115-b in wireless communication environment 200 of FIG. 2. At the start of process flow 300, base station 105-a may be communicating with UE 115-a and 115-b using a primary cell (e.g., primary cell 225 of FIG. 2). The primary cell may use a frequency of a licensed frequency band such as a band licensed to a cellular network operator associated with the base station 105-a.

Base station 105-a may configure UEs 115-a and 115-b for wide-band interference measurements of the unlicensed frequency band by sending wide-band interference reporting configurations 305-a and 305-b to UE 115-a and UE 115-b, respectively. The wide-band interference reporting configurations may include one or more parameters that identify the frequency channel(s) to measure, timing for performing measurements, and timing for reporting measurements. In some cases, the wide-band interference reporting configurations may include an RMTC or a DRS occasion configuration. The DRS occasion configuration may include a DMTC window as well as indicate when the DRS will be transmitted. The RMTC and/or the DRS occasion configuration may apply to configured secondary cells as well as any cells on a candidate frequency. In some cases, the RMTC may include configuration for reporting average RSSI and channel occupancy (e.g., a percentage of measurement samples for which the RSSI may be above a threshold) in a reporting interval. In some examples, the wide-band interference reporting configurations may include a reporting period for wide-band interference feedback, filter coefficients for filtering measured wide-band interference to obtain filtered wide-band interference, or trigger events for reporting wide-band interference measurements.

The UEs 115-a and 115-b may perform wide-band interference measurements 310-a and 310-b, respectively. Wide-band interference measurements 310 may include measuring a total received wide-band power over each of the frequency channels, which may be measured concurrently or during different (e.g., staggered, etc.) measurement windows. The measurements may be performed regardless of whether the base station 105-a may be transmitting during the measurement windows. The UEs 115-a and 115-b may perform multiple measurements (e.g., periodically) for each measured frequency channel, and may perform filtering 315-a and 315-b on the measured wide-band interference. The filtering may be performed using any suitable filter (e.g., infinite impulse response (IIR) filter, finite impulse response (FIR) filter, etc.), and may be performed according to the filter coefficients configured by the base station 105-a.

The base station 105-a may also perform wide-band interference measurements 320 on frequency channels of the unlicensed frequency band and may perform filtering 325 on the measured wide-band interference.

UEs 115-a and 115-b may provide wide-band interference feedback reports 330-a and 330-b, respectively. Wide-band interference feedback reports 330 may include a an indicator (e.g., RSSI, etc.) providing information about signal strength measurements (e.g., a total received wide-band power) for the frequency channels of the unlicensed frequency band configured for wide-band interference measurement. Although only a single wide-band interference feedback report 330 is illustrated from each UE 115-a and 115-b, one or more wide-band interference feedback reports 330 may be provided periodically or aperiodically. For example, the base station 105-a may configure the UEs 115-a and 115-b to periodically feedback wide-band interference reports.

Additionally or alternatively, the wide-band interference feedback reports 330 may be triggered aperiodically by base station 105-a (e.g., a trigger command in downlink control information (DCI), etc.) or be triggered based on a reporting trigger. For example, the base station 105-a may configure the UEs 115-a and 115-b to send reports when a wide-band interference measurement for a secondary cell of the base station 105-a is less than a first threshold (U1), the wide-band interference measurement for the secondary cell is greater than a second threshold (U2), a wide-band interference measurement for a candidate frequency channel is less than a third threshold (U4), a wide-band interference measurement for a candidate frequency channel plus an offset is less than the wide-band interference measurement for the secondary cell (U3), the wide-band interference for the secondary cell becomes higher than a threshold and a candidate channel is simultaneously better than another (e.g., lower) threshold (U5), and the like. In some cases, the UE 115 may wait for a timer interval (e.g., time-to-trigger (TTT), etc.) to verify that the trigger condition persists before sending the report.

The base station 105-a may perform channel selection 335 based on its own measurements of frequency channels of the unlicensed frequency band and wide-band interference feedback received from the UEs 115-a and 115-b. The base station 105-a may assign one or more frequency channels of the unlicensed frequency band for the secondary cell 230 and may configure the UEs 115-a and 115-b for operation on the secondary cell 230.

Figure 4A:
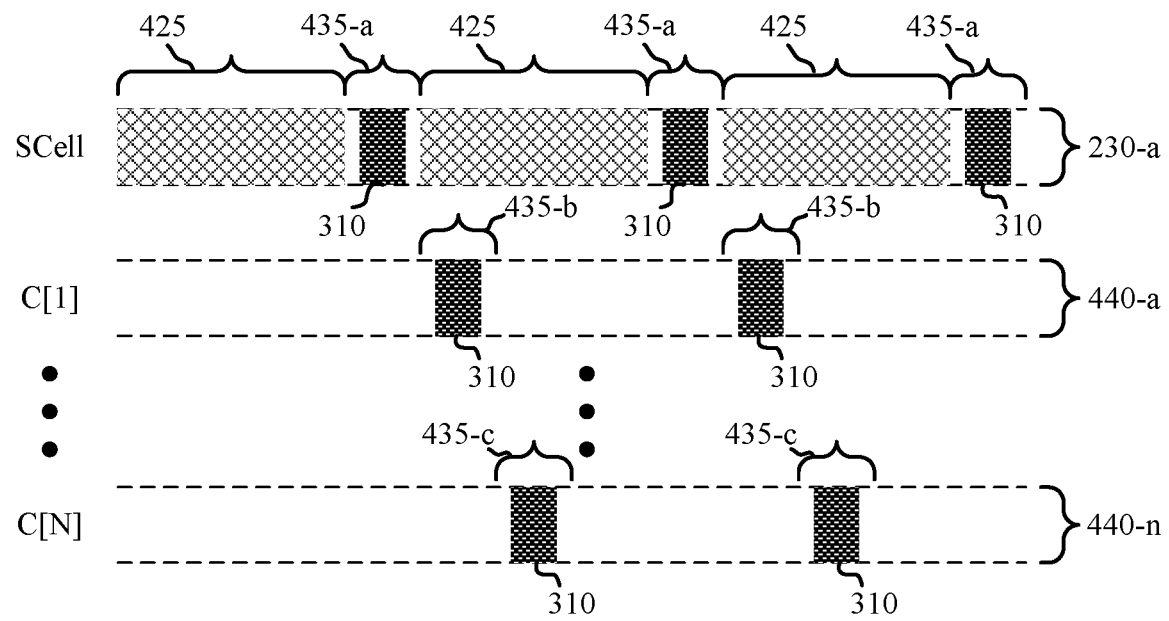
FIG. 4A illustrates an example timing diagram for wide-band interference measurements for channel selection in unlicensed frequency bands in accordance with various aspects of the present disclosure.

FIG. 4A illustrates an example timing diagram 400-a for wide-band interference measurements for channel selection in unlicensed frequency bands in accordance with various aspects of the present disclosure. Timing diagram 400-a illustrates example timing for wide-band interference measurements for secondary cell 230-a and candidate channels C[1] 440-a through C[N] 440-n for a UE 115. Secondary cell 230-a may be an example of secondary cell 230 of FIGS. 1 and 2. Candidate channels C[1] 440-a through C[N] 440-n may be frequency channels of an unlicensed frequency band not configured as secondary cells for the UE. Candidate channels C[1] 440-a through C[N] 440-n may be, for example, channels for which a base station 105 performing channel selection in the unlicensed frequency band is not currently using or is currently only using as configured secondary cells for other UEs.

The base station 105 may configure the UE 115 for performing wide-band interference measurements 310 on secondary cell 230-a and candidate channels C[1] 440-a through C[N] 440-n. For example, the base station 105 may indicate timing information for performing wide-band interference measurements for the secondary cell 230-a and/or candidate channels 440 based on DRX cycles for the UEs 115 or a measurement timing configuration. In some cases, the measurement timing configuration may include an RMTC or a DRS occasion configuration for the secondary cell 230-a. The DRS occasion configuration may include a DMTC window as well as indicate when the DRS will be transmitted. The RMTC(s) and the DRS occasion configuration(s) may apply to configured secondary cells (e.g., secondary cell 230-a, etc.) as well as candidate channels C[1] 440-a through C[N] 440-n. For example, an RMTC for a frequency channel (e.g., configured secondary cell or candidate channel, etc.) may indicate a periodicity for signal strength measurement periods 435, a subframe offset for signal strength measurement periods 435, and/or a duration of the signal strength measurement periods 435 (e.g., a number of symbol periods, a number of subframes, etc.). In some cases, an RMTC may include configuration information for reporting average RSSI (e.g., filter parameters, etc.) and channel occupancy (e.g., a percentage of measurement samples of the signal strength measurement periods for which the RSSI may be above a configured threshold) in a reporting interval.

In some cases, the base station 105 silences transmissions 425 during signal strength measurement periods 435-a (e.g., does not transmit on any frequency resources within a frequency channel assigned to the secondary cell 230-a) for the secondary cell 230-a. Regardless of whether the base station 105 silences transmissions during signal strength measurement periods 435-a or continues transmission to the UE 115 or other UEs 115, the UE 115 may perform wide-band measurements 310 (e.g., received signal strength measurements, etc.) during signal strength measurement periods 435-a over the frequency channel of the secondary cell 230-a for interference reporting.

As illustrated in FIG. 4A, a UE 115 may also be configured for signal strength measurement periods 435-b for wide-band measurements on a candidate channel C[1] 440-a and signal strength measurement periods 435-c for wide-band measurements on a candidate channel C[N] 440-n. The configuration for signal strength measurement periods on a candidate channel 440 may include an RMTC or a DRS occasion configuration. As illustrated in FIG. 4A, different frequencies (e.g., secondary cells or candidate channels) may be configured for a UE 115 with separate measurement timing configurations with different signal strength measurement periods 435. Although not configured for the UE 115 for which the measurement timing configuration is illustrated in FIG. 4A, candidate frequencies C[1] 440-a through C[N] 440-n may be configured secondary cells for other UEs 115. The base station 105 may silence transmissions (e.g., on all frequency resources of the channel) on cells configured on the candidate frequencies C[1] 440-a through C[N] 440-n for other UEs during the respective signal strength measurement periods 435 so that the UE 115 and/or other UEs 115 can provide interference feedback for the channel.

The UE 115 may perform wide-band measurements 310 during the configured signal strength measurement periods 435 for the configured measurement objects. Wide-band measurements 310 may include measuring a total received wide-band power and may include co-channel interference, interference from transmissions on adjacent channels, and other interference (e.g., thermal noise, etc.). The UE 115 may filter the wide-band measurements 310 and provide wide-band interference feedback (e.g., RSSI, etc.) based on the filtered wide-band interference measurements 310 to the base station 105.

Figure 4B:
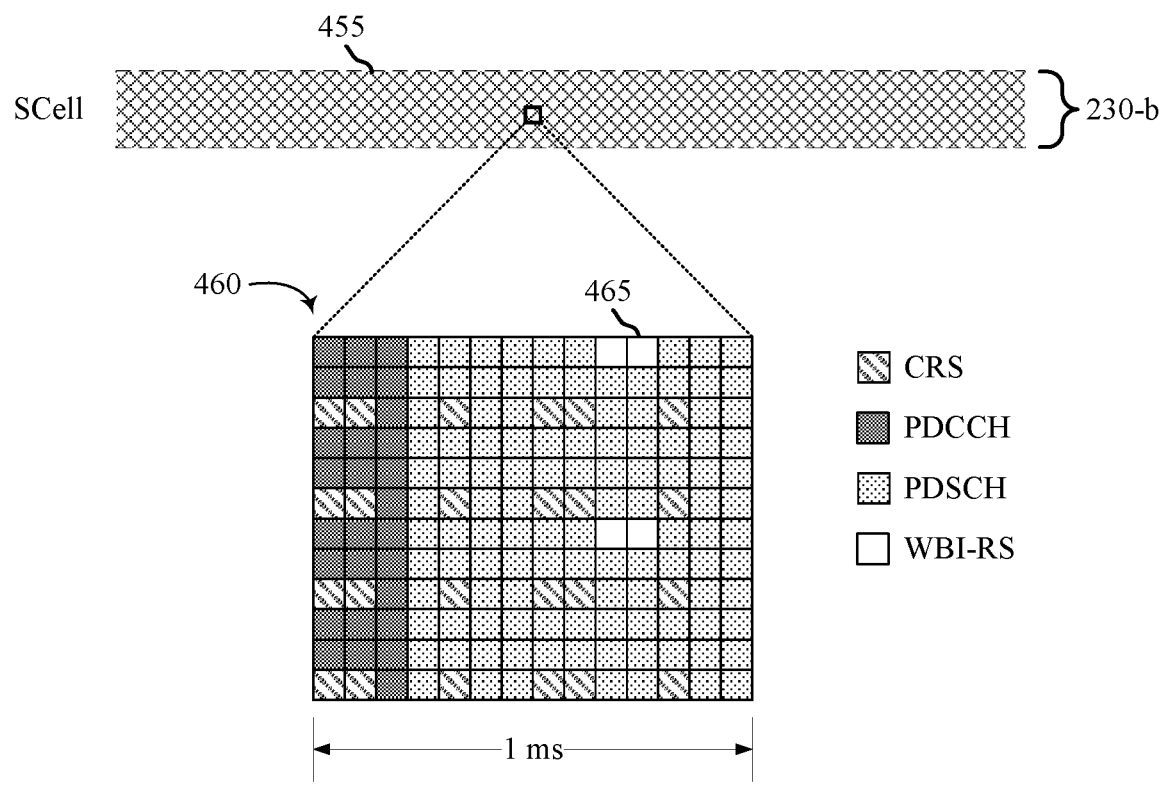
FIG. 4B illustrates an example timing diagram for wide-band interference measurements for channel selection in unlicensed frequency bands in accordance with various aspects of the present disclosure.

Additionally or alternatively, a measurement timing configuration for a UE 115 may provide a set of resource elements used for wide-band interference measurements. FIG. 4B illustrates an example timing diagram 400-b for wide-band interference measurements for channel selection in unlicensed frequency bands in accordance with various aspects of the present disclosure. Timing diagram 400-b illustrates example timing for wide-band interference measurements for a secondary cell 230-b. Secondary cell 230-b may be an example of secondary cells 230 of FIG. 1, 2, or 4A.

A base station 105 may be transmitting using an LTE/LTE-A carrier waveform 455 via secondary cell 230-b on a frequency channel of an unlicensed frequency band. The LTE/LTE-A carrier waveform 455 may include frequency and time resources that may be allocated in resource blocks 460. Resource blocks 460 may include resources allocated to physical channels (e.g., PDCCH, PDSCH, etc.) and reference signals (e.g., CRS, CSI-RS, IMR, etc.). The physical channels may also include additional reference signals (e.g., UE-RS). The base station 105 may silence transmission on resources of the carrier waveform 455 allocated for performing wide-band inference measurements (e.g., wide-band interference reference signals (WBI-RS)). In some cases, the WBI-RS resources 465 may be a portion of the resources allocated for the CSI-RS, IMR, or UE-RS (e.g., assigned to a particular antenna port, etc.). In some examples, the WBI-RS resources 465 may include each subcarrier of one or more symbols across the bandwidth of secondary cell 230-*b* for a particular subframe. In some examples, the base station 105 may silence transmission on the WBI-RS resources 465 during configured signal strength measurement periods only (e.g., configured according to periodicity, subframe offset, duration, etc.).

Figure 5:
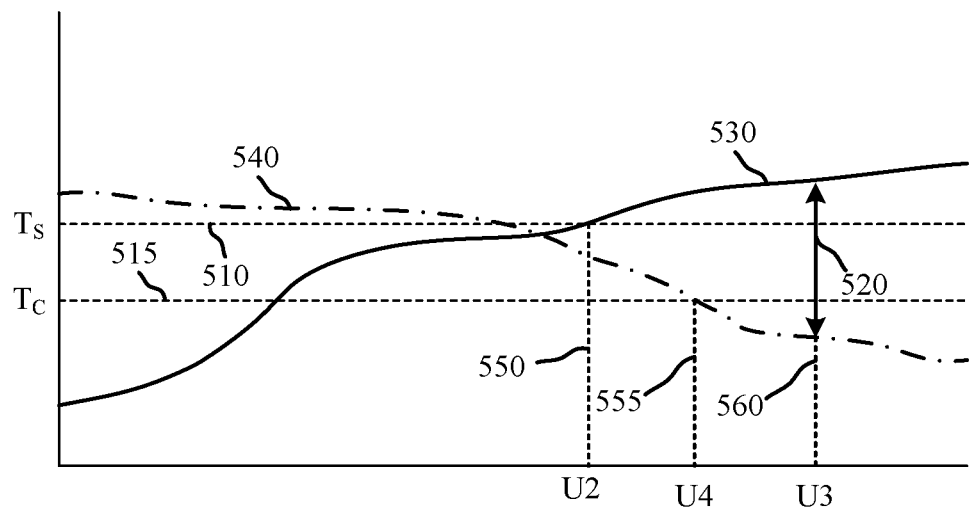
FIG. 5 illustrates an example timing diagram for reporting wide-band interference feedback in accordance with various aspects of the present disclosure.

FIG. 5 illustrates an example of a timing diagram 500 for reporting wide-band interference feedback in accordance with various aspects of the present disclosure. Timing diagram 500 may illustrate, for example, reporting wide-band interference feedback for a secondary cell or one or more candidate frequency channels based on configured measurement objects as discussed above.

In timing diagram 500, a base station 105 may configure a UE 115 for reporting wide-band interference feedback for a secondary cell and a candidate frequency channel based on reporting triggers. Secondary cell interference 530 may represent the filtered wide-band received signal strength at the UE 115 for the secondary cell and candidate frequency interference 540 may represent the filtered wide-band received signal strength at the UE 115 for the candidate frequency channel.

A first report 550 (e.g., U2 event) may be triggered when the secondary cell interference 530 becomes greater than a threshold Ts 510. A second report 555 (e.g., U4 event) may be triggered when the candidate frequency interference 540 becomes less than threshold Tc 515. A third report 560 (e.g., U3 event) may be triggered when the candidate frequency interference 540 plus an offset 520 becomes less than the secondary cell interference 530. Timing diagram 500 only illustrates timing for some trigger events, and other events may trigger additional reports, as described above.

Figure 6:
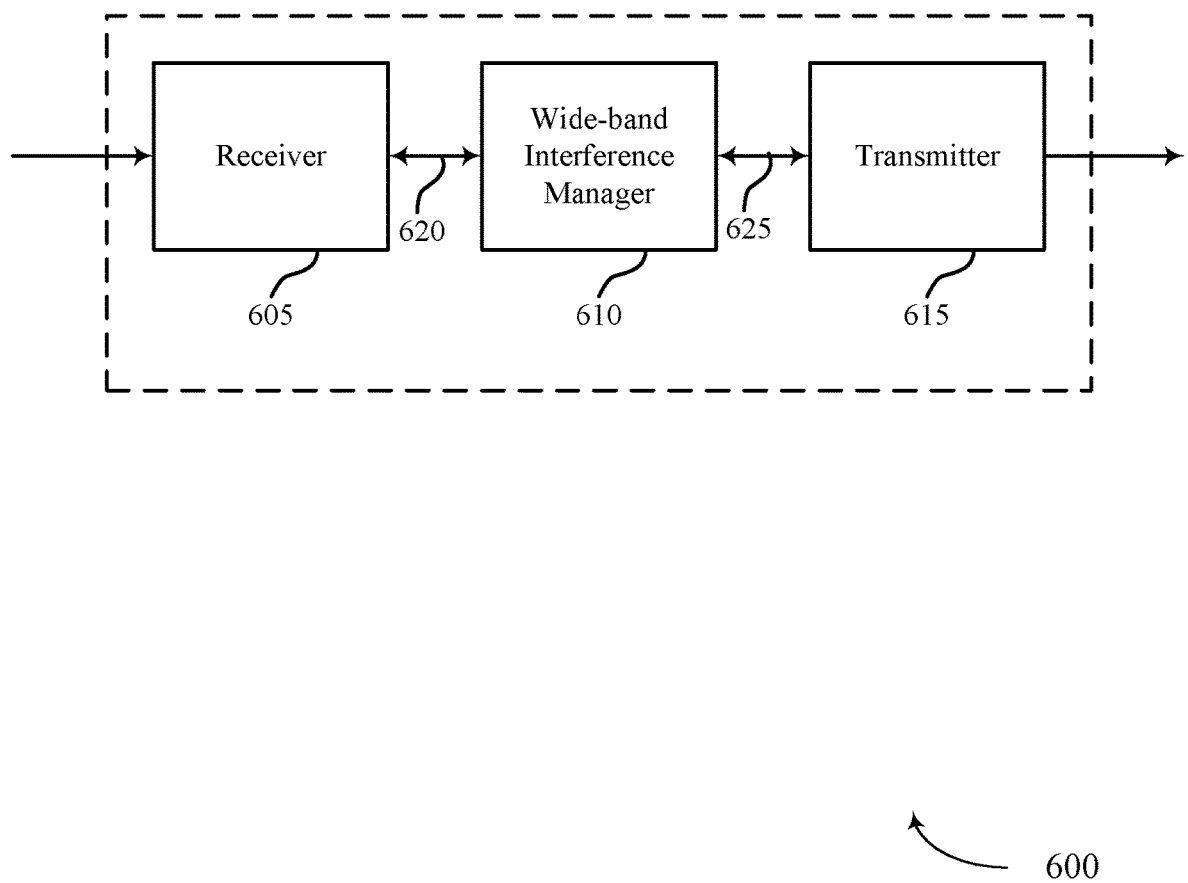
FIG. 6 shows a block diagram of a wireless device configured for providing wide-band interference feedback for channel selection in an unlicensed frequency band in accordance with various aspects of the present disclosure.

FIG. 6 shows a block diagram of a wireless device 600 configured for providing wide-band interference feedback for channel selection in an unlicensed frequency band in accordance with various aspects of the present disclosure. Wireless device 600 may be an example of aspects of a UE 115 described with reference to FIGS. 1-5. Wireless device 600 may include a receiver 605, a wide-band interference manager 610, or a transmitter 615. Wireless device 600 may also include a processor. Each of these components may be in communication with each other.

The receiver 605 may receive information such as packets, user data, or control information associated with various information channels (e.g., control channels, data channels, and information related to LTE-U RRM based on silent interference measurements, etc.). Information 620 may be passed on to the wide-band interference manager 610, and to other components of wireless device 600. For example, information 720 may include received signaling or detected power received via one or more channels (e.g., secondary cells, candidate frequency channels, etc.).

The wide-band interference manager 610 may identify a configuration for measuring and reporting wide-band interference for one or more frequency channels of an unlicensed frequency band to a base station, perform wide-band interference measurements for the one or more frequency channels, filter the wide-band interference measurements to obtain a filtered wide-band interference for the one or more frequency channels, and report the filtered wide-band interference to the base station.

The transmitter 615 may transmit signals 625 received from other components of wireless device 600. In some examples, the transmitter 615 may be collocated with the receiver 605 in a transceiver. The transmitter 615 may include a single antenna, or it may include a plurality of antennas.

Figure 7:
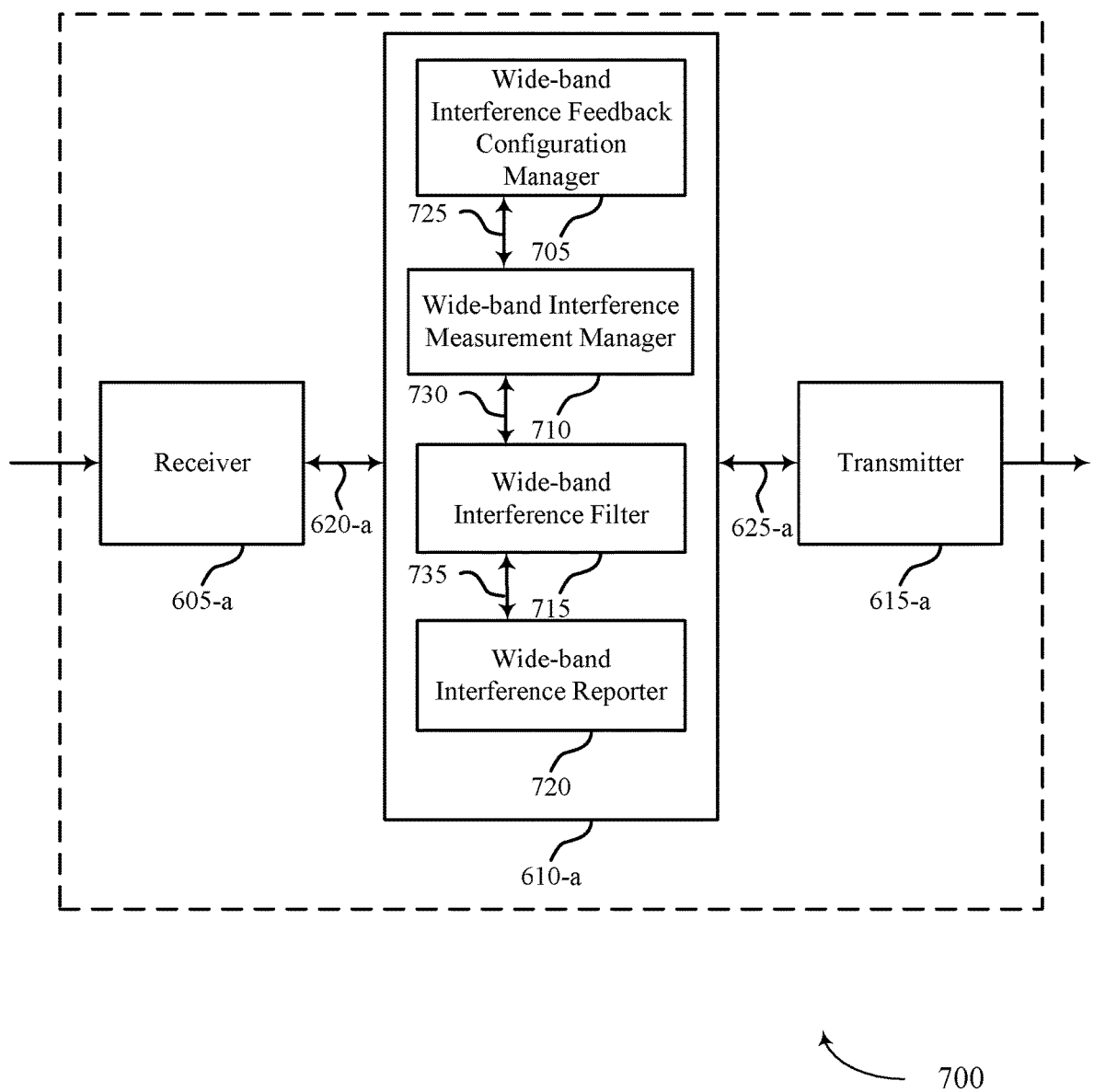
FIG. 7 shows a block diagram of a wireless device for providing wide-band interference feedback for channel selection in an unlicensed frequency band in accordance with various aspects of the present disclosure.

FIG. 7 shows a block diagram of a wireless device 700 for providing wide-band interference feedback for channel selection in an unlicensed frequency band in accordance with various aspects of the present disclosure. Wireless device 700 may be an example of aspects of a wireless device 600 or a UE 115 described with reference to FIGS. 1-6. Wireless device 700 may include a receiver 605-*a*, a wide-band interference manager 610-*a*, or a transmitter 615-*a*. Wireless device 700 may also include a processor. Each of these components may be in communication with each other. The wide-band interference manager 610-*a* may also include a wide-band interference feedback configuration manager 705, a wide-band interference measurement manager 710, a wide-band interference filter 715, and a wide-band interference reporter 720.

The receiver 605-*a* may receive signals and interference via one or more channels (e.g., secondary cells, candidate frequency channels, etc.) and pass along information 620-*a* to wide-band interference manager 610-*a*, and to other components of device 700. The wide-band interference manager 610-*a* may perform the operations described herein with reference to FIG. 6. The transmitter 615-*a* may transmit signals 625-*a* received from other components of wireless device 700.

The wide-band interference feedback configuration manager 705 may identify a measurement timing configuration indicating signal strength measurement periods for one or more frequency channels of an unlicensed frequency band as described herein with reference to FIGS. 2-5. For example, the measurement timing configuration may include one or more measurement objects (e.g., frequency channels, timing parameters, etc.) for measuring and reporting wide-band interference of channels of an unlicensed frequency band.

In some examples, the configuration comprises timing information indicating signal strength measurement periods for which the base station suppresses transmission on a serving cell of the one or more frequency channels. The wide-band interference feedback configuration manager 705 may send measurement timing information 725 to the wide-band interference measurement manager 710. The measurement timing information 725 may include, for example, time periods for performing measurements of received signal strength for a secondary cell or a candidate channel as described above with reference to FIGS. 1-6.

The wide-band interference measurement manager 710 may perform wide-band interference measurements for the one or more frequency channels as described herein with reference to FIGS. 2-5. In some examples, the performing the wide-band interference measurements for the one or more frequency channels comprises measuring one or more of interference measurement resources for a serving cell of the one or more frequency channels, channel state information reference signal (CSI-RS) resources silenced by the base station for the serving cell, a total power received across a bandwidth of the serving cell for signal strength measurement periods associated with the serving cell, or a total power received across a bandwidth of a candidate frequency channel of the unlicensed frequency band not currently used for communication by the base station. The wide-band interference measurement manager 710 may send an interference measurement 730 to the wide-band interference filter 735.

The wide-band interference filter 715 may filter the wide-band interference measurements to obtain a filtered wide-band interference for the one or more frequency channels as described herein with reference to FIGS. 2-5. The wide-band interference filter 715 may send a filtered measurement 735 to the wide-band interference reporter 720.

The wide-band interference reporter 720 may report the filtered wide-band interference to the base station as described herein with reference to FIGS. 2-5. The reporting may be performed periodically, aperiodically based on triggers from the base station, or based on triggering events configured by the base station. For example, the triggering event for reporting the filtered wide-band interference to the base station may include a wide-band interference measurement for a serving cell of the base station being greater than a first threshold, the wide-band interference measurement for the serving cell being less than a second threshold, a wide-band interference measurement for a candidate frequency channel of the unlicensed frequency band not currently used for communication by the base station being less than a third threshold, or the wide-band interference measurement for the candidate frequency channel plus an offset being less than the wide-band interference measurement for the serving cell.

Figure 8:
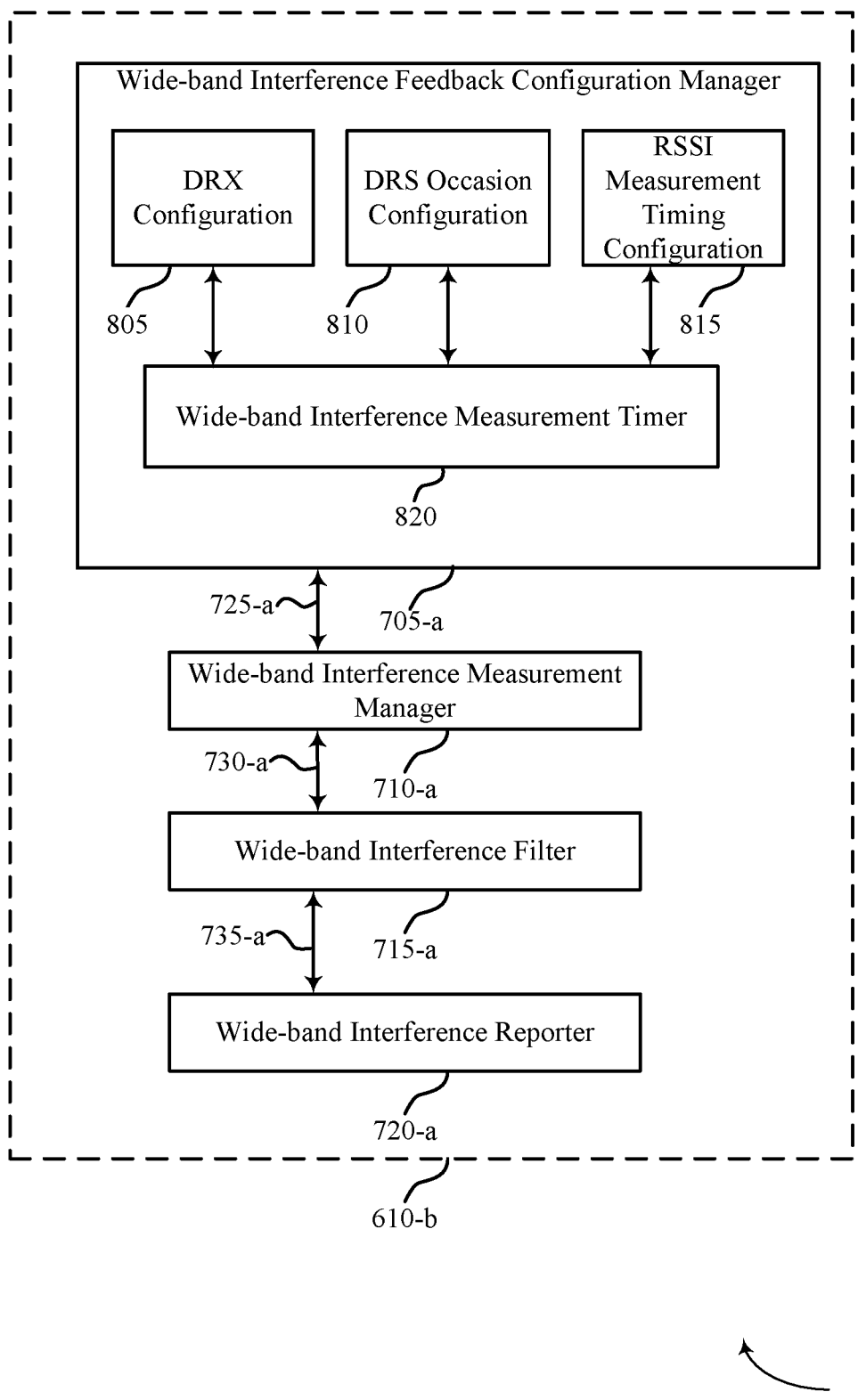
FIG. 8 shows a block diagram of a wide-band interference manager for providing wide-band interference feedback for channel selection in an unlicensed frequency band in accordance with various aspects of the present disclosure.

FIG. 8 shows a block diagram 800 of a wide-band interference manager 610-*b* for providing wide-band interference feedback for channel selection in an unlicensed frequency band in accordance with various aspects of the present disclosure. The wide-band interference manager 610-*b* may be an example of aspects of wide-band interference manager 610 described with reference to FIGS. 6-7. The wide-band interference manager 610-*b* may include a wide-band interference feedback configuration manager 705-*a*, a wide-band interference measurement manager 710-*a*, a wide-band interference filter 715-*a*, and a wide-band interference reporter 720-*a*. Each of these elements may perform the functions described herein with reference to FIG. 7. The wide-band interference feedback configuration manager 705-*a* may include a DRX configuration 805, DRS occasion configuration 810, an RSSI measurement timing configuration 815, and a wide-band interference measurement timer 820. The DRX configuration 805 may include one or more parameters related to DRX operation of the UE 115. The DRS occasion configuration 810 may include DRS information and DMTC parameters for one or more secondary cells. The RSSI measurement timing configuration may include one or more sets of parameters indicating signal strength measurement periods for one or more frequency channels (e.g., configured secondary cells or candidate frequency channels, etc.).

The wide-band interference measurement timer 820 may identify measurement time periods for one or more frequency channels based at least in part on the DRX configuration 805, DRS occasion configuration 810, and/or RSSI measurement timing configuration 815. For example, measurement time periods for a given candidate frequency channel may be identified based on an RSSI measurement timing configuration for the channel and the ON durations of a DRX cycle. The wide-band interference feedback configuration manager may send timing information 725-*a* including the measurement time periods to the wide-band interference measurement manager 710.

Furthermore, as described with reference to FIG. 7, wide-band interference measurement manager 710-*a* may send interference measurement 730-*a* to wide-band interference filter 715-*a*. Wide-band interference filter 715-*a* may send filtered measurement 735-*a* to wide-band interference reporter 720-*a*.

The components of the devices 600 and 700, including wide-band interference managers 610 of FIGS. 6, 7, and 8 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 9:
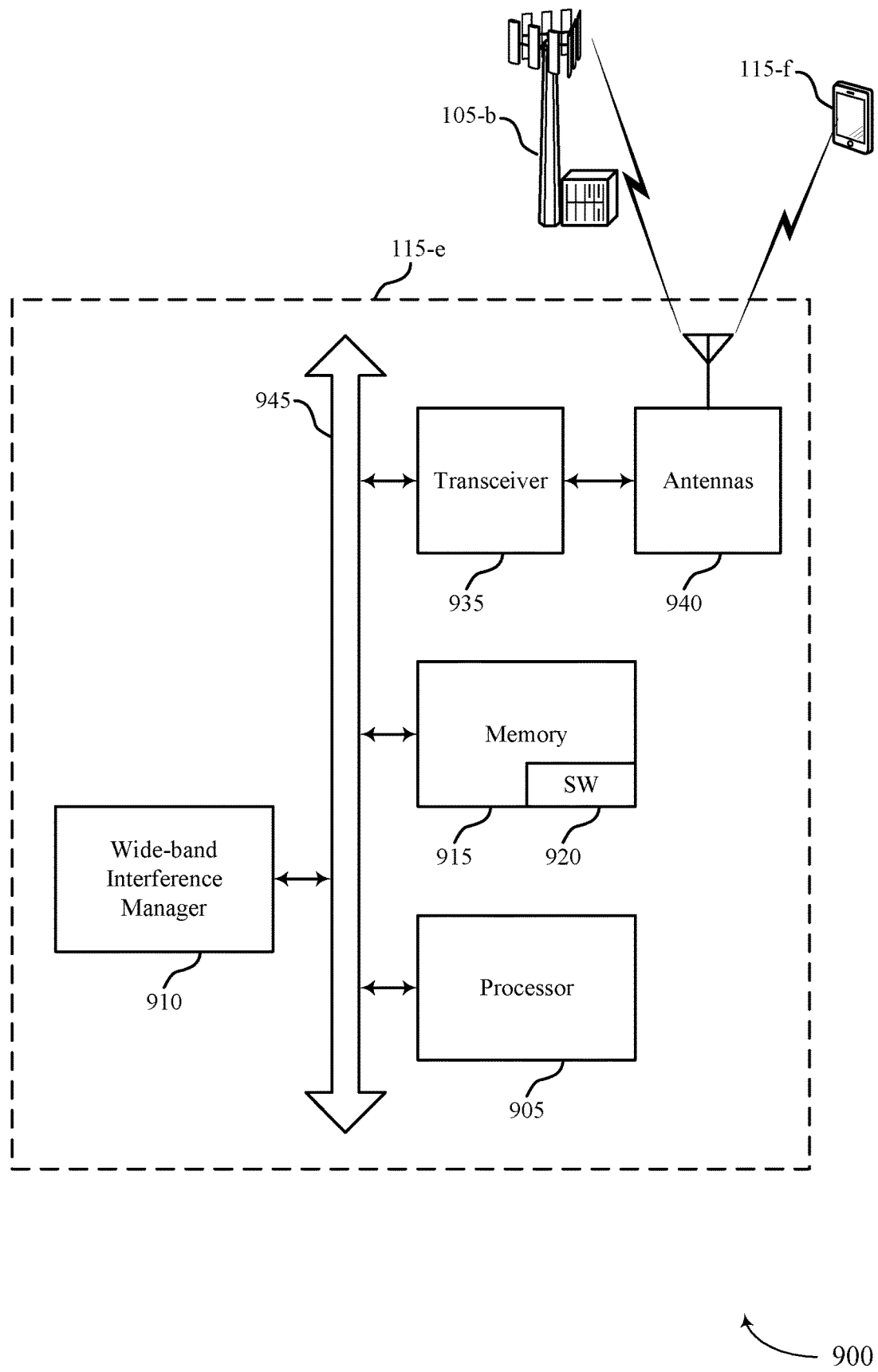
FIG. 9 shows a diagram of a system including a UE configured for providing wide-band interference feedback for channel selection in an unlicensed frequency band in accordance with various aspects of the present disclosure.

FIG. 9 shows a diagram of a system 900 including a UE 115 configured for providing wide-band interference feedback for channel selection in an unlicensed frequency band in accordance with various aspects of the present disclosure. System 900 may include UE 115-*e*, which may be an example of a wireless device 600, a wireless device 700, or a UE 115 described herein with reference to FIGS. 1, 2, 3, and 6-8. UE 115-*e* may include a wide-band interference manager 910, which may be an example of a wide-band interference manager 610 described with reference to FIGS. 6-8. UE 115-*e* may also include components for bi-directional voice and data communications including components for transmitting communications and components for receiving communications. For example, UE 115-*e* may communicate bi-directionally with base station 105-*b* or UE 115-*f*.

UE 115-*e* may also include a processor 905, and memory 915 (including software (SW)) 920, a transceiver 935, and one or more antenna(s) 940, each of which may communicate, directly or indirectly, with one another (e.g., via buses 945). The transceiver 935 may communicate bi-directionally, via the antenna(s) 940 or wired or wireless links, with one or more networks, as described above. For example, the transceiver 935 may communicate bi-directionally with a base station 105 or another UE 115. The transceiver 935 may include a modem to modulate the packets and provide the modulated packets to the antenna(s) 940 for transmission, and to demodulate packets received from the antenna(s) 940. While UE 115-*e* may include a single antenna 940, UE 115-*e* may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor 905 to perform various functions described herein (e.g., providing wide-band interference feedback for channel selection in an unlicensed frequency band, etc.). Alternatively, the software/firmware code 920 may not be directly executable by the processor 905 but cause a computer (e.g., when compiled and executed) to perform functions described herein. The processor 905 may include an intelligent hardware device, (e.g., a central processing unit (CPU), a microcontroller, an ASIC, etc.)

Figure 10:
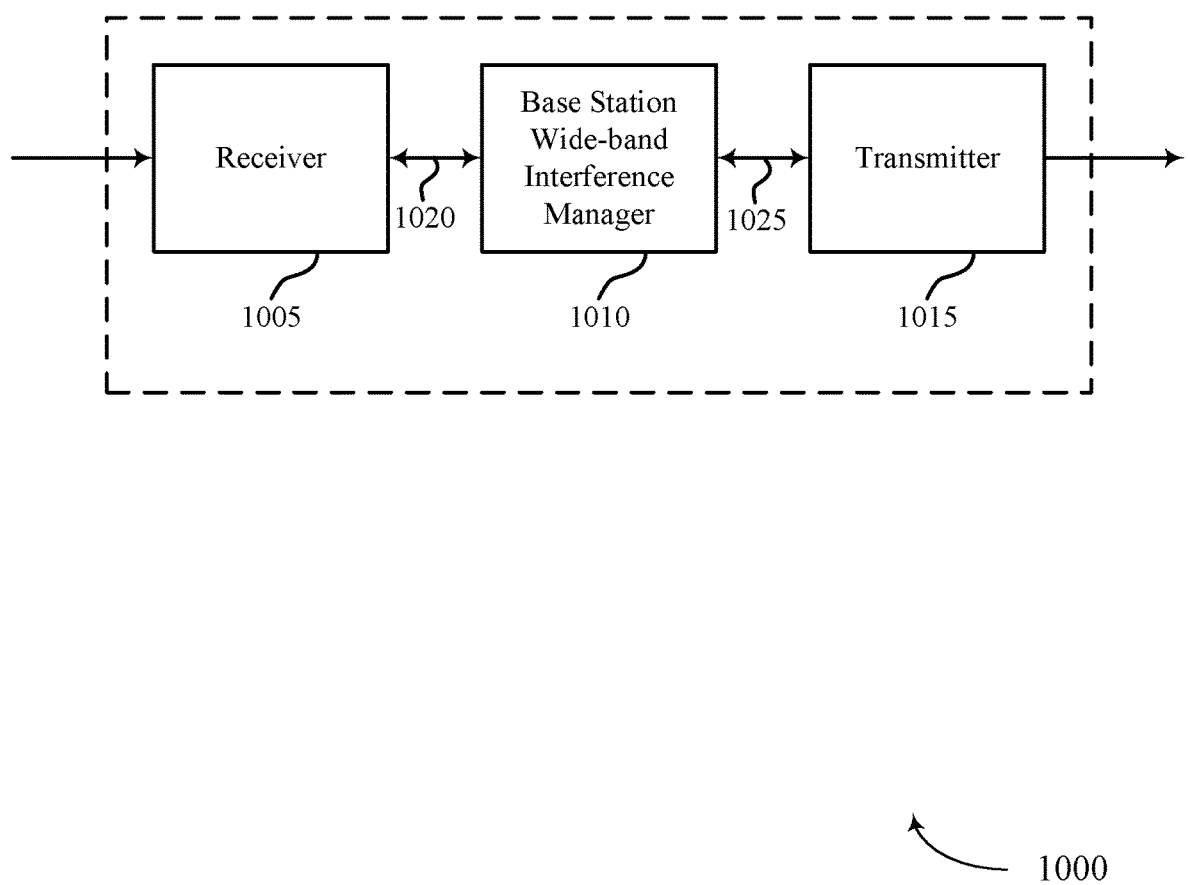
FIG. 10 shows a block diagram of a wireless device configured for performing channel selection in an unlicensed frequency band in accordance with various aspects of the present disclosure.

FIG. 10 shows a block diagram of a wireless device 1000 configured for performing channel selection in an unlicensed frequency band in accordance with various aspects of the present disclosure. Wireless device 1000 may be an example of aspects of a base station 105 described with reference to FIGS. 1-9. Wireless device 1000 may include a receiver 1005, a base station wide-band interference manager 1010, or a transmitter 1015. Wireless device 1000 may also include a processor. Each of these components may be in communication with each other.

The receiver 1005 may receive information such as packets, user data, or control information associated with various information channels (e.g., control channels, data channels, and information related to wide-band interference measurements, etc.). The receiver 1005 may pass information 1020 on to the base station wide-band interference manager 1010, and to other components of wireless device 1000. In some examples, the receiver 1005 may receive UE wide-band interference information reported by UEs served by the base station 105.

The base station wide-band interference manager 1010 may configure served UEs for reporting wide-band signal strength for one or more frequency channels of an unlicensed frequency band, receive UE wide-band interference feedback from the UEs, determine base station wide-band interference information by measuring interference for the one or more frequency channels, and identify a frequency channel for a secondary cell of the base station based at least in part on the base station wide-band interference information and the received UE wide-band interference information.

The transmitter 1015 may transmit signals 1025 received from other components of wireless device 1000. In some examples, the transmitter 1015 may be collocated with the receiver 1005 in a transceiver. The transmitter 1015 may include a single antenna, or it may include a plurality of antennas. In some examples, the transmitter 1015 may silence transmission on a secondary cell for signal strength measurement periods.

Figure 11:
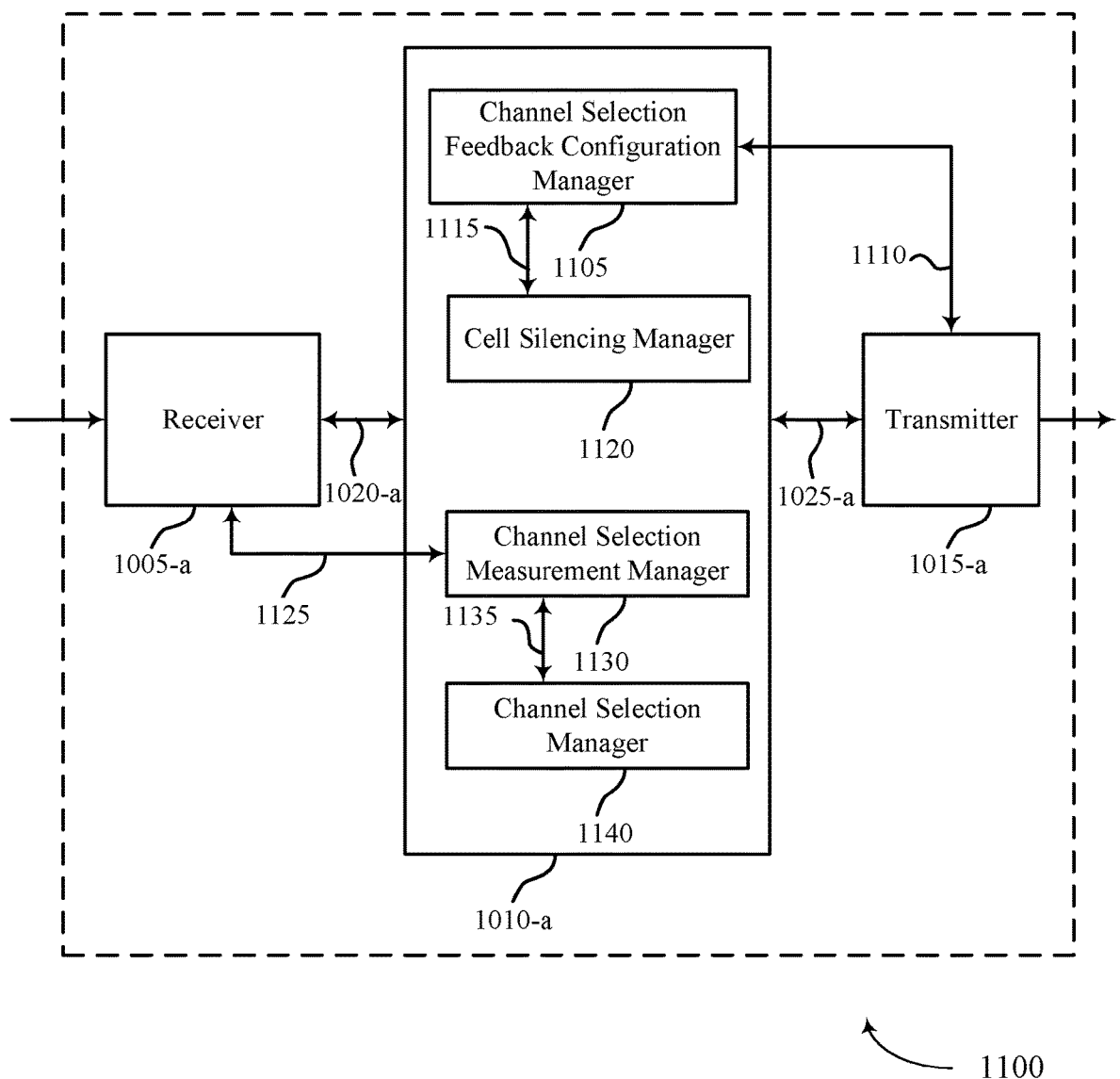
FIG. 11 shows a block diagram of a wireless device for performing channel selection in an unlicensed frequency band in accordance with various aspects of the present disclosure.

FIG. 11 shows a block diagram of a wireless device 1100 for performing channel selection in an unlicensed frequency band in accordance with various aspects of the present disclosure. Wireless device 1100 may be an example of aspects of a wireless device 1000 or a base station 105 described with reference to FIGS. 1-10. Wireless device 1100 may include a receiver 1005-a, a base station wide-band interference manager 1010-a, or a transmitter 1015-a. Wireless device 1100 may also include a processor. Each of these components may be in communication with each other. The base station wide-band interference manager 1010-a may also include a channel selection feedback configuration manager 1105, a cell silencing manager 1120, a channel selection measurement manager 1130, and a channel selection manager 1140.

The components of wireless device 1100 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 1005-a may receive information, for example packets, user data, or control information. The receiver 1005-a may pass information 1020-a to base station wide-band interference manager 1010-a, and to other components of a base station 105. The base station wide-band interference manager 1010-a may perform the operations described herein with reference to FIG. 10. The transmitter 1015-a may transmit signals 1025-a received from other components of wireless device 1100.

The channel selection feedback configuration manager 1105 may configure UE(s) 115 for reporting wide-band signal strength for one or more frequency channels of an unlicensed frequency band as described herein with reference to FIGS. 2-5. In some examples, the configuring the UE(s) may include sending to the UE(s) any of configuration information (e.g., a DRS occasion configuration, an RMTC, etc.) indicating signal strength measurement periods for a frequency channel (e.g., serving cell or candidate channel) of the one or more frequency channels, frequency information identifying a candidate frequency channel of the unlicensed frequency band, a wide-band interference reporting period, a filter coefficient for filtering measured wide-band interference to obtain filtered wide-band interference, channel occupancy thresholds, or combinations thereof. In some examples, the one or more frequency channels include at least one candidate frequency channel of the unlicensed frequency band not currently used for communication by the base station. The channel selection feedback configuration manager 1105 may send configuration information 1110 to the UEs 115 (e.g., via transmitter 1015-a). The channel selection feedback configuration manager 1105 may send signal strength measurement period information 1115 to the cell silencing manager 1120.

The cell silencing manager 1120 may silence serving cells for configured signal strength measurement periods. The cell silencing manager 1120 may silence the transmitter 1015-a based on the signal strength measurement period information 1115, which may indicate allocated resources (e.g., any number of serving cells) to be silenced by the base station. The signal strength measurement period information 1115 may be based on, for example, a DRS occasion configuration or an RMTC.

The channel selection measurement manager 1130 may determine base station wide-band interference information by measuring signal strength for the one or more frequency channels (e.g., via receiver 1005-a) as described herein with reference to FIGS. 2-5. The channel selection measurement manager 1130 may additionally receive UE wide-band received signal strength information 1125 (e.g., via the receiver 1005-a) measured by the UE(s) 115 according to the timing information 1110 sent to the UE(s) 115. The channel selection measurement manager 1130 may aggregate interference information for frequency channels of an unlicensed frequency band including the base station wide-band interference information and the UE wide-band received signal strength information 1125 and send the aggregate interference information 1135 to the channel selection manager 1140.

The channel selection manager 1140 may perform channel selection for frequency channels of the unlicensed frequency band based on the aggregate interference information 1135. For example, the channel selection manager 1140 may identify a frequency channel for a secondary cell of the base station based at least in part on the base station wide-band interference information and the received UE wide-band received signal strength information 1125 as described herein with reference to FIGS. 2-5. In some examples, multiple UEs are being served by a primary cell of the base station, and the identifying the frequency channel for the secondary cell may include determining a frequency channel having a lowest combined interference level or strongest signal strength information based at least in part on the base station wide-band interference information and the received UE wide-band interference information.

Figure 12:
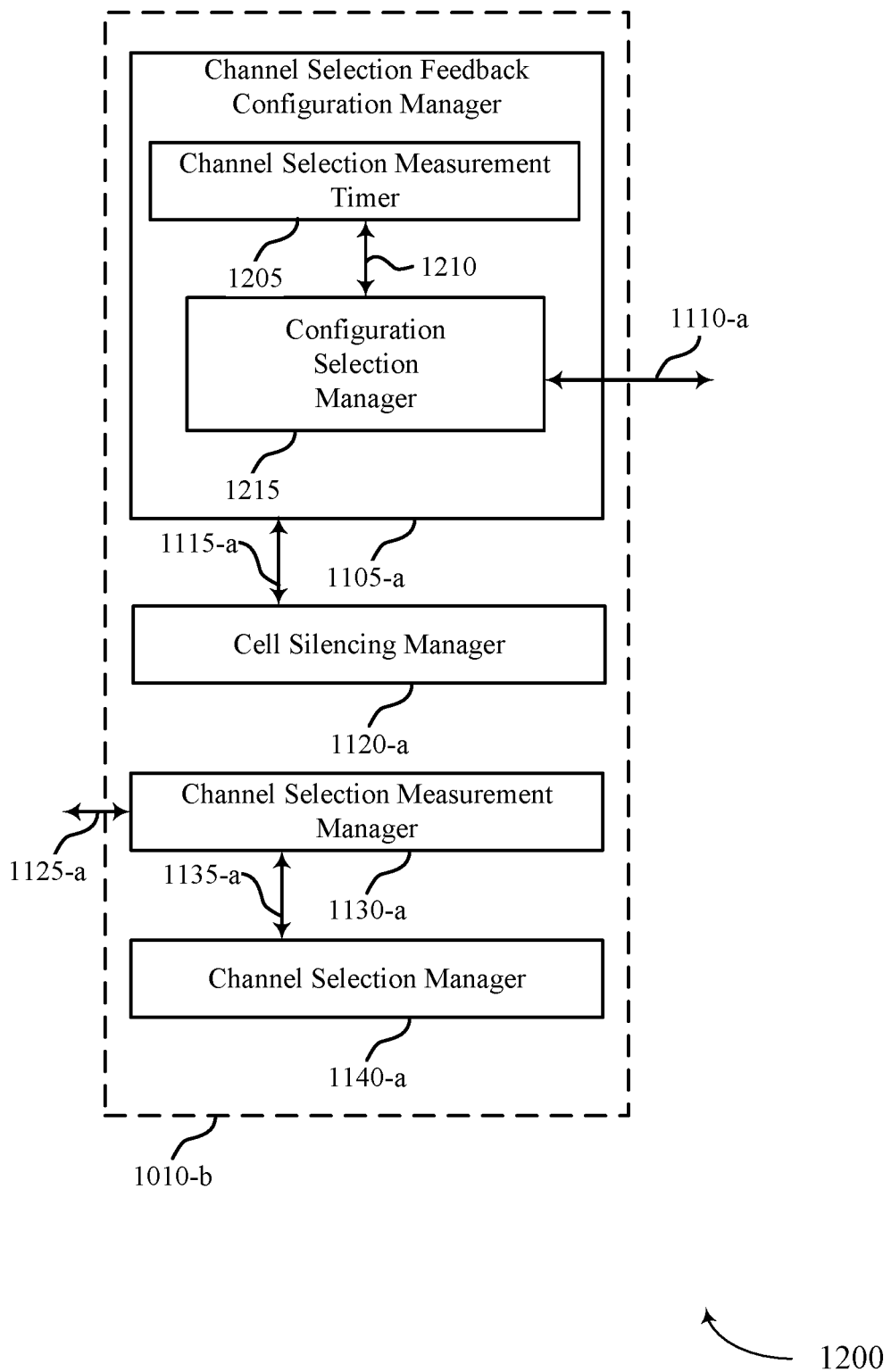
FIG. 12 shows a block diagram of a base station wideband interference manager 1010-b for performing channel selection in an unlicensed frequency band in accordance with various aspects of the disclosure

FIG. 12 shows a block diagram 1200 of a base station wide-band interference manager 1010-b for performing channel selection in an unlicensed frequency band in accordance with various aspects of the disclosure. The base station wide-band interference manager 1010-*b* may be an example of aspects of a base station wide-band interference manager 1010 described with reference to FIGS. 10-11. The base station wide-band interference manager 1010-*b* may include a channel selection feedback configuration manager 1105-*a*, a cell silencing manager 1120-*a*, a channel selection measurement manager 1130-*a*, and a channel selection manager 1140-*a*. Each of these elements may perform the functions described herein with reference to FIG. 11. The base station wide-band interference manager 1010-*b* may also include a channel selection measurement timer 1205 and a configuration selection manager 1215.

The channel selection measurement timer 1205 may identify resources of the base station 105 to be silenced for signal strength measurements. For example, the channel selection measurement timer 1205 may determine a schedule for signal strength measurement periods for serving cells of the base station 105. The channel selection measurement timer 1205 may send measurement timing information 1210 to the configuration selection manager 1215.

The configuration selection manager 1215 may send, to the at least one UE, configuration information 1110-*a* indicating signal strength measurement periods for which the base station suppresses transmission on a serving cell or the one or more frequency channels as described herein with reference to FIGS. 2-5. The configuration information 1110-*a* may be based on the measurement timing information 1210, received from the channel selection measurement timer 1205. In some examples, the timing information 1110-*a* may include one or more of a DRX cycle for the at least one UE, a measurement timing configuration indicating timing for the signal strength measurement periods for the serving cell, such as RMTC, or a DRS occasion configuration for the serving cell. The DRS occasion configuration may include a DMTC window as well as indicate when the DRS will be transmitted. The RMTC and the DRS occasion configuration may be identified by configured secondary cells as well as any candidate frequencies. In some cases, the RMTC may include configuration for reporting average RSSI and channel occupancy (e.g., a percentage of measurement samples for which the RSSI may be above a threshold) in a reporting interval. The channel selection feedback configuration manager 1105-*a* may compile the configuration information 1110-*a* as described above and send signal strength measurement period information 1115-*a* to the cell silencing manager 1120-*a*.

The cell silencing manager 1120-*a* may silence any of the serving cells of the base station 105 during corresponding signal strength measurement periods as described with reference to FIGS. 10-11. The cell silencing manager 1120-*a* may silence the frequencies based on the signal strength measurement period information 1115-*a*.

The channel selection measurement manager 1130-*a* may receive UE wide-band received signal strength information 1125-*a* (e.g., via a receiver 1005) to determine base station wide-band interference information as described herein with reference to FIGS. 10-11. The channel selection measurement manager 1130-*a* may send aggregate interference information 1135-*a* to the channel selection manager 1140-*a*. The channel selection manager 1140-*a* may perform channel selection for frequency channels of the unlicensed frequency band (e.g., select which channels to use as secondary cells for served UEs) as described herein with reference to FIGS. 10-11.

The configurations of the devices 1000 and 1100 including the base station wide-band interference managers 1010 of FIGS. 10, 11, and 12 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 13:
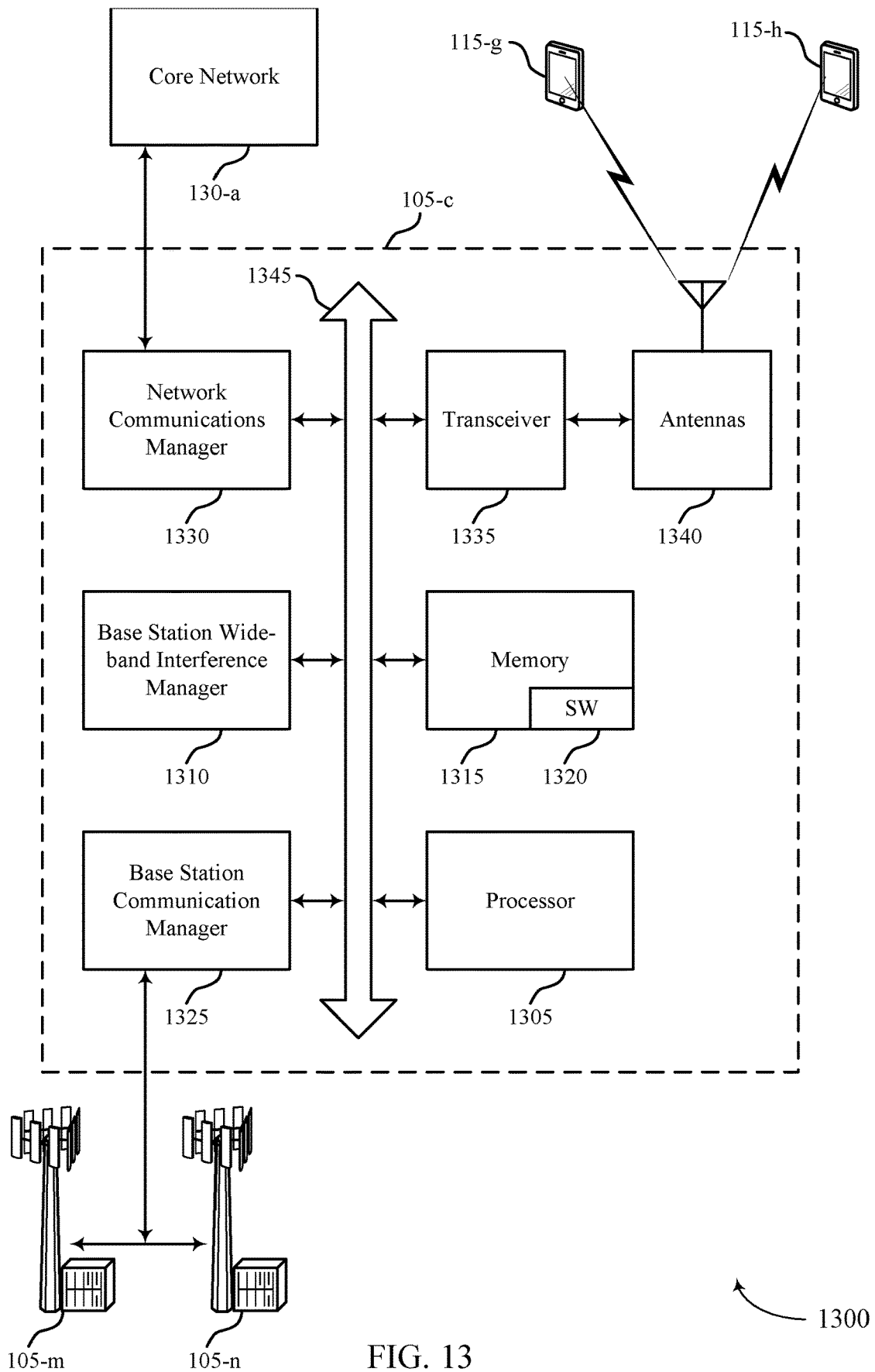
FIG. 13 shows a diagram of a system including a base station configured for performing channel selection in an unlicensed frequency band in accordance with various aspects of the present disclosure.

FIG. 13 shows a diagram of a system 1300 including a base station 105-*c* configured for performing channel selection in an unlicensed frequency band in accordance with various aspects of the present disclosure. Base station 105-*c* may be an example of a wireless device 1000, a wireless device 1100, or a base station 105 described herein with reference to FIGS. 1, 2, 3, and 10-12. Base Station 105-*c* may include a base station wide-band interference manager 1310, which may be an example of a base station wide-band interference manager 1010 described with reference to FIGS. 10-12. Base Station 105-*c* may also include components for bi-directional voice and data communications including components for transmitting communications and components for receiving communications. For example, base station 105-*c* may communicate bi-directionally with UEs 115-*g* and 115-*h*.

In some cases, base station 105-*c* may have one or more wired backhaul links. Base station 105-*c* may have a wired backhaul link (e.g., S1 interface, etc.) to the core network 130-*a*. Base station 105-*c* may also communicate with other base stations 105, such as base station 105-*m* and base station 105-*n* via inter-base station backhaul links (e.g., an X2 interface). Each of the base stations 105 may communicate with UEs 115 using the same or different wireless communications technologies. In some cases, base station 105-*c* may communicate with other base stations such as 105-*m* or 105-*n* utilizing base station communication manager 1325. In some examples, base station communication manager 1325 may provide an X2 interface within an LTE/LTE-A wireless communication network technology to provide communication between some of the base stations 105. In some examples, base station 105-*c* may communicate with other base stations through core network 130-*a*. In some cases, base station 105-*c* may communicate with the core network 130-*a* through network communications manager 1330.

The base station 105-*c* may include a processor 1305, memory 1315 (including software (SW) 1320), transceiver 1335, and antenna(s) 1340, which each may be in communication, directly or indirectly, with one another (e.g., over bus system 1345). The transceivers 1335 may be configured to communicate bi-directionally, via the antenna(s) 1340, with the UEs 115, which may be multi-mode devices. The transceiver 1335 (or other components of the base station 105-*c*) may also be configured to communicate bi-directionally, via the antennas 1340, with one or more other base stations (not shown). The transceiver 1335 may include a modem configured to modulate the packets and provide the modulated packets to the antennas 1340 for transmission, and to demodulate packets received from the antennas 1340. The base station 105-*c* may include multiple transceivers 1335, each with one or more associated antennas 1340. The transceiver may be an example of a combined receiver 1005 and transmitter 1015 of FIG. 10.

The memory 1315 may include RAM and ROM. The memory 1315 may also store computer-readable, computer-executable software code 1320 containing instructions that are configured to, when executed, cause the processor 1310 to perform various functions described herein (e.g., performing channel selection in an unlicensed frequency band, session processing, database management, message routing, etc.). Alternatively, the software 1320 may not be directly executable by the processor 1305 but be configured to cause the computer, e.g., when compiled and executed, to perform functions described herein. The processor 1305 may include an intelligent hardware device, e.g., a CPU, a microcontroller, an ASIC, etc. The processor 1305 may include various special purpose processors such as encoders, queue processing configurations, base band processors, radio head controllers, digital signal processor (DSPs), and the like.

The base station communications manager 1325 may manage communications with other base stations 105. The communications manager may include a controller or scheduler for controlling communications with UEs 115 in cooperation with other base stations 105. For example, the base station communications manager 1325 may coordinate scheduling for transmissions to UEs 115 for various interference mitigation techniques such as beamforming or joint transmission.

Figure 14:
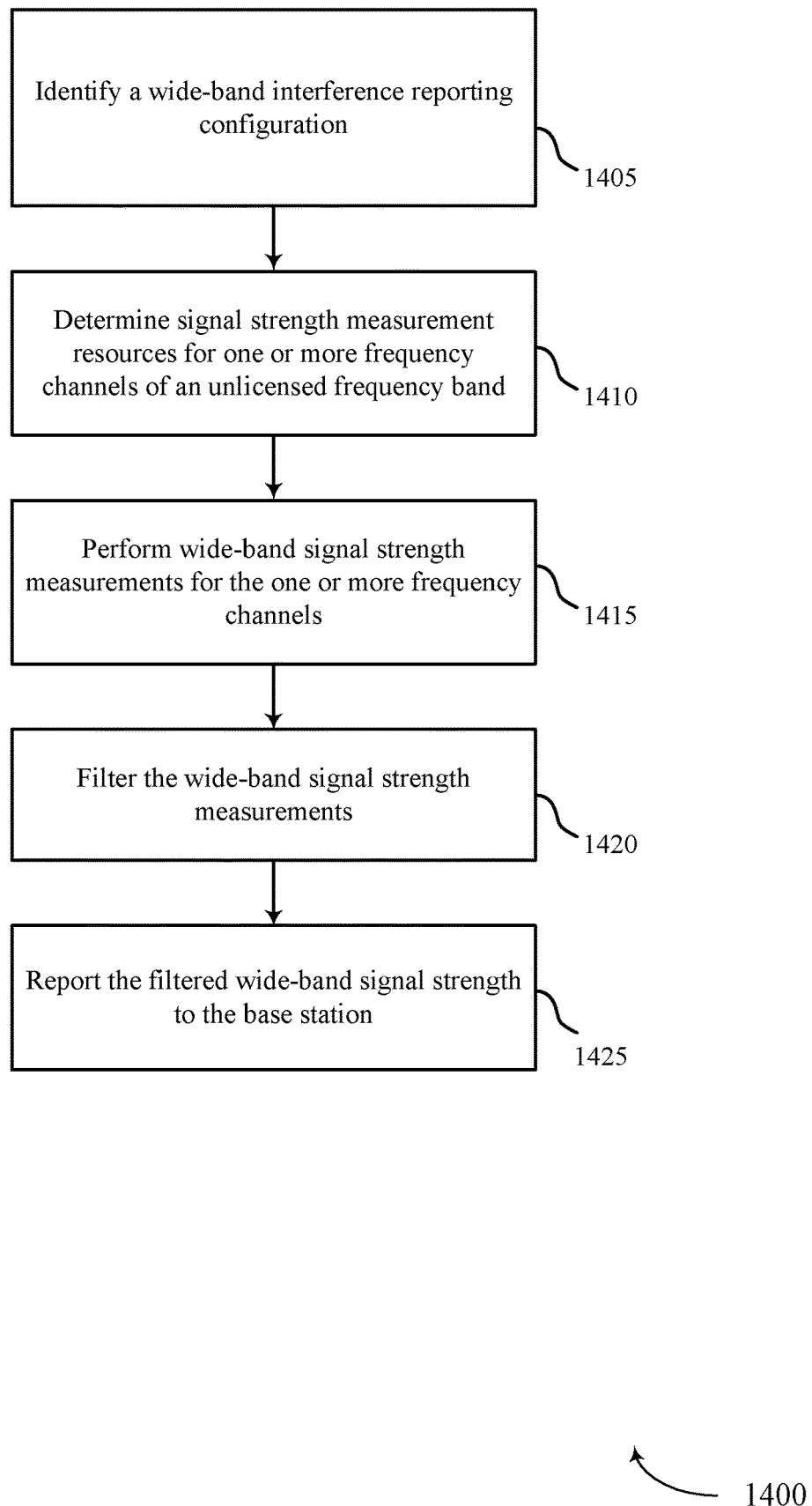
FIG. 14 shows a flowchart illustrating a method for providing wide-band interference feedback for channel selection in an unlicensed frequency band in accordance with various aspects of the present disclosure.

FIG. 14 shows a flowchart illustrating a method 1400 for providing wide-band interference feedback for channel selection in an unlicensed frequency band in accordance with various aspects of the present disclosure. The operations of method 1400 may be implemented by a UE 115 or its components as described with reference to FIGS. 1-13. For example, the operations of method 1400 may be performed by the wide-band interference manager 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware.

At block 1405, the UE 115 may identify a wide-band interference reporting configuration as described herein with reference to FIGS. 2-5. In some cases, the configuration comprises identification of frequency channels (e.g., secondary cell, candidate channel, etc.) and timing information indicating signal strength measurement periods for which the base station suppresses transmission on the frequency channels. The timing information may include one or more of a DRX cycle for the UE, a measurement timing configuration (e.g., RMTC) indicating timing for the signal strength measurement periods, or a DRS occasion configuration for a cell as described herein with reference to FIGS. 2-5. The DRS occasion configuration may include a DMTC window as well as indicate when the DRS will be transmitted. Each RMTC and/or DRS occasion configuration may be associated with a configured secondary cell or a candidate frequency. In some cases, the RMTC may include configuration for reporting average RSSI and channel occupancy (e.g., a percentage of measurement samples for which the RSSI may be above a threshold) in a reporting interval. For example, where an RMTC is provided for a secondary cell, the UE 115 may assume that the base station is not transmitting on any resources of the cell during the signal strength measurement periods configured by the RMTC. In addition or alternatively to the signal strength measurement periods, the UE 115 may determine resources (e.g., one or more resource elements or symbol periods) allocated for interference measurements based on the timing information (e.g., as described with reference to FIG. 4B). The wide-band interference reporting configuration may also include information for filtering or reporting wide-band signal strength (e.g., filter parameters, periodic reporting interval, etc.). In certain examples, the operations of block 1405 may be performed by the wide-band interference feedback configuration manager 705 as described herein with reference to FIG. 7.

At block 1410, the UE 115 may determine signal strength measurement resources for the one or more frequency channels based at least in part on the timing information. For example the UE 115 may determine that a wide-band signal strength measurement can be made over a frequency channel during one or more time intervals (e.g., symbol periods, subframes, etc.) of a signal strength measurement period configured by an RMTC. In certain examples, the operations of block 1410 may be performed by the wide-band interference timer 805 as described herein with reference to FIG. 8.

At block 1415, the UE 115 may perform wide-band signal strength measurements for the one or more frequency channels as described herein with reference to FIGS. 2-5. In certain examples, the operations of block 1415 may be performed by the wide-band interference measurement manager 710 as described herein with reference to FIG. 7.

At block 1420, the UE 115 may filter the wide-band signal strength measurements as described herein with reference to FIGS. 2-5. The filtering may be performed according to parameters received in the wide-band interference reporting configuration. In certain examples, the operations of block 1420 may be performed by the wide-band interference filter 715 as described herein with reference to FIG. 7.

At block 1425, the UE 115 may report the filtered wide-band interference to the base station 105 as described herein with reference to FIGS. 2-5. In certain examples, the operations of block 1425 may be performed by the wide-band interference reporter 720 as described herein with reference to FIG. 7.

Figure 15:
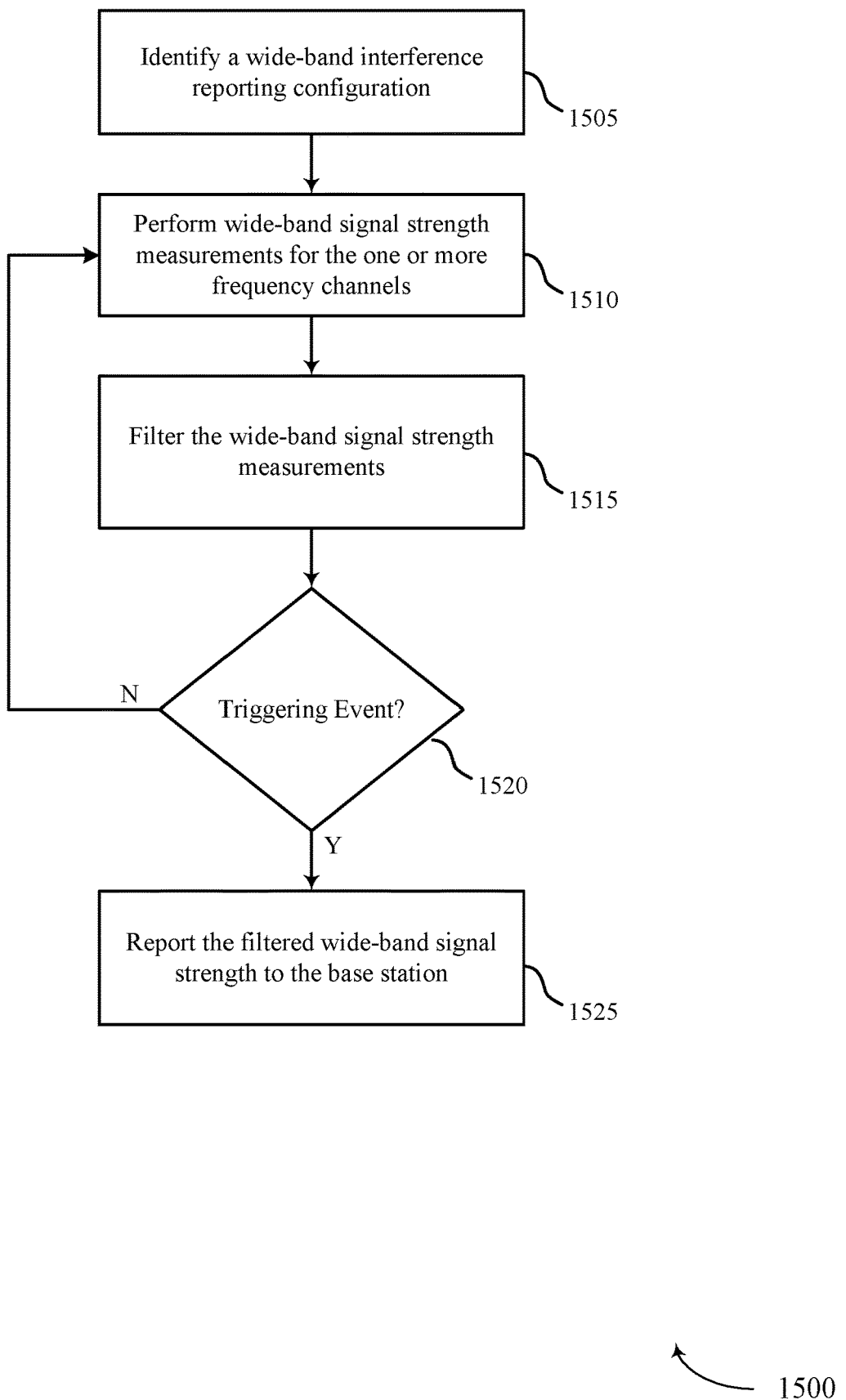
FIG. 15 shows a flowchart illustrating a method for providing wide-band interference feedback for channel selection in an unlicensed frequency band in accordance with various aspects of the present disclosure.

FIG. 15 shows a flowchart illustrating a method 1500 for providing wide-band interference feedback for channel selection in an unlicensed frequency band in accordance with various aspects of the present disclosure. The operations of method 1500 may be implemented by a UE 115 or its configurations as described with reference to FIGS. 1-13. For example, the operations of method 1500 may be performed by the wide-band interference manager 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1400 of FIG. 14.

At block 1505, the UE 115 may identify a wide-band interference reporting configuration as described herein with reference to FIGS. 2-5 and block 1405 of FIG. 14. In some embodiments, the wide-band interference reporting configuration may include triggering events for reporting wide-band signal strength of frequency channels of the unlicensed frequency band. In certain examples, the operations of block 1505 may be performed by the wide-band interference feedback configuration manager 705 as described herein with reference to FIG. 7.

At block 1510, the UE 115 may perform wide-band signal strength measurements for the one or more frequency channels as described herein with reference to FIGS. 2-5 and blocks 1410 and 1415 of FIG. 14. In certain examples, the operations of block 1510 may be performed by the wideband interference measurement manager 710 as described herein with reference to FIG. 7.

At block 1515, the UE 115 may filter the wide-band interference signal strength to obtain a filtered wide-band signal strength for the one or more frequency channels as described herein with reference to FIGS. 2-5 and block 1420 of FIG. 14. In certain examples, the operations of block 1515 may be performed by the wide-band interference filter 715 as described herein with reference to FIG. 7.

At block 1520, the UE 115 may identify a reporting event triggering the reporting the filtered wide-band interference to the base station 105 as described herein with reference to FIGS. 2-5. In some cases, the reporting of wide-band signal strength e may be triggered by a wide-band signal strength measurement for a serving cell of the base station 105 being greater than a first threshold, the wide-band signal strength measurement for the serving cell being less than a second threshold, a wide-band signal strength measurement for a candidate frequency channel of the unlicensed frequency band not currently used for communication by the base station 105 being less than a third threshold, or the wide-band signal strength measurement for the candidate frequency channel plus an offset being less than the wide-band signal strength measurement for the serving cell. In certain examples, the operations of block 1520 may be performed by the wide-band signal strength feedback configuration manager 705 as described herein with reference to FIG. 7.

If a triggering event is detected at block 1520, the UE 115 may report the filtered wide-band signal strength to the base station at block 1525. If no triggering events are detected at block 1520, the UE 115 may continue to perform wide-band signal strength measurements at block 1510. In certain examples, the operations of block 1525 may be performed by the wide-band interference reporter 720 as described herein with reference to FIG. 7.

Figure 16:
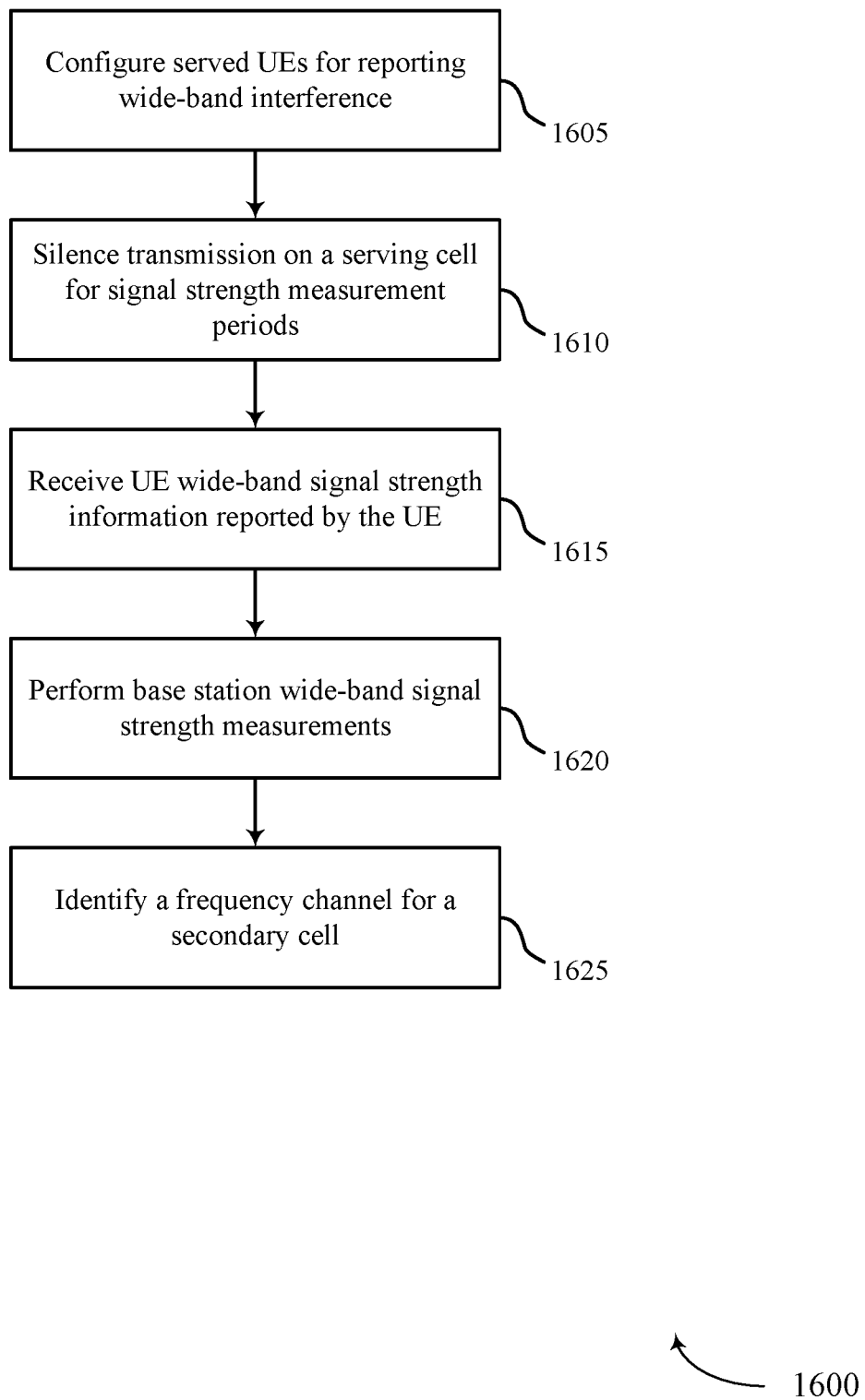
FIG. 16 shows a flowchart illustrating a method for performing channel selection in an unlicensed frequency band in accordance with various aspects of the present disclosure.

FIG. 16 shows a flowchart illustrating a method 1600 for performing channel selection in an unlicensed frequency band in accordance with various aspects of the present disclosure. The operations of method 1600 may be implemented by a base station 105 or its components as described with reference to FIGS. 1-13. For example, the operations of method 1600 may be performed by the base station wide-band interference manager 1010 as described with reference to FIGS. 10-13. In some examples, a base station 105 may execute a set of codes to control the functional elements of the base station 105 to perform the functions described below. Additionally or alternatively, the base station 105 may perform aspects the functions described below using special-purpose hardware.

At block 1605, the base station 105 may configure served UEs 115 for reporting wide-band interference for one or more frequency channels of an unlicensed frequency band as described herein with reference to FIGS. 2-5. For example, the base station 105 may send, to the served UEs 115, timing information indicating signal strength measurement periods for which the base station 105 suppresses transmission on a serving cell of the one or more frequency channels as described herein with reference to FIGS. 2-5. In certain examples, the operations of block 1605 may be performed by the channel selection feedback configuration manager 1105 as described herein with reference to FIG. 11 or 12.

At block 1610, the base station 105 may silence transmission on the serving cell for the signal strength measurement periods as described herein with reference to FIGS. 2-5. In some cases, the base station 105 may silence any number of serving cells for corresponding signal strength measurement periods. In certain examples, the operations of block 1610 may be performed by the cell silencing manager 1120 as described herein with reference to FIG. 11.

At block 1615, the base station 105 may receive UE wide-band signal strength information reported by the at least one UE as described herein with reference to FIGS. 2-5. The UE wide-band signal strength information may include indicators of signal strength (e.g., RSSI) for serving cells and/or candidate frequency channels. In certain examples, the operations of block 1615 may be performed by the receiver 1005 as described herein with reference to FIG. 10.

At block 1620, the base station 105 may determine base station wide-band signal strength information by measuring signal strength for the one or more frequency channels as described herein with reference to FIGS. 2-5. In certain examples, the operations of block 1620 may be performed by the channel selection measurement manager 1130 as described herein with reference to FIG. 11.

At block 1625, the base station 105 may select a frequency channel for a secondary cell of the base station 105 based at least in part on the base station wide-band signal strength information and the received UE wide-band signal strength information as described herein with reference to FIGS. 2-5. In certain examples, the operations of block 1625 may be performed by the channel selection manager 1140 as described herein with reference to FIG. 11.

Thus, methods 1400, 1500, and 1600 may provide for UE-aided channel selection in unlicensed frequency bands. It should be noted that methods 1400, 1500, and 1600 describe possible implementation, and that the operations and the steps may be rearranged or otherwise modified such that other implementations are possible. In some examples, aspects from two or more of the methods 1400, 1500, and 1600 may be combined.

The detailed description set forth above in connection with the appended drawings describes exemplary configurations and does not represent all the examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and configurations described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication, comprising:
   identifying, at a user equipment (UE), a configuration for reporting a received signal strength indicator (RSSI) for channel selection assistance to a base station, wherein the configuration comprises one or more measurement windows for performing measurements of RSSI on one or more corresponding frequency channels and a reporting period for reporting the measurements of RSSI;
   performing wide-band measurements of received power for the one or more frequency channels during the one or more measurement windows, the measured received power for each of the one or more frequency channels comprising a total co-channel interference over each of the one or more frequency channels;
   filtering the wide-band measurements to obtain respective RSSIs for the one or more frequency channels; and
   reporting, according to the reporting period, the respective RSSIs to the base station.

2. The method of claim 1, wherein the one or more measurement windows comprise time intervals when the wide-band measurements are performed regardless of transmission by the base station over the one or more frequency channels.

3. The method of claim 1, wherein the configuration comprises one or more of a discontinuous reception (DRX) cycle for the UE, a measurement timing configuration indicating timing for the one or more measurement windows, or a discovery reference signal (DRS) configuration for a cell.

4. The method of claim 1, wherein the performing the wide-band measurements for the one or more frequency channels during the one or more measurement windows comprises measuring one or more of a total power received across a bandwidth of a serving cell, or a total power received across a bandwidth of a candidate frequency channel of the one or more frequency channels not currently used for communication to the UE.

5. The method of claim 1, further comprising:
identifying a reporting event comprising one or more of a wide-band received power measurement for a serving cell of the base station being greater than a first threshold, the wide-band received power measurement for the serving cell being less than a second threshold, a wide-band received power measurement for a candidate frequency channel of the one or more frequency channels not currently used for communication by the base station being less than a third threshold, or the wide-band received power measurement for the candidate frequency channel plus an offset being less than the wide-band received power measurement for the serving cell; and
reporting, based at least in part on identifying the reporting event, the respective RSSIs to the base station.

6. The method of claim 1, wherein the configuration for reporting the RSSI comprises an indication of a set of resources for performing the wide-band measurements.

7. The method of claim 1, wherein the one or more frequency channels comprise one or more candidate frequency channels not currently used for communication by the base station.

8. The method of claim 1, wherein the one or more frequency channels comprise one or more channels of an unlicensed frequency band.

9. An apparatus for wireless communication, comprising:
a processor;
memory in electronic communication with the processor; and
instructions stored in the memory and operable, when executed by the processor, to cause the apparatus to:
identify, at a user equipment (UE), a configuration for reporting a received signal strength indicator (RSSI) for channel selection assistance to a base station, wherein the configuration comprises one or more measurement windows for performing measurements of RSSI on one or more corresponding frequency channels and a reporting period for reporting the measurements of RSSI;
perform wide-band measurements of received power for the one or more frequency channels during the one or more measurement windows, the measured received power for each of the one or more frequency channels comprising a total co-channel interference over each of the one or more frequency channels;
filter the wide-band measurements to obtain respective RSSIs for the one or more frequency channels; and
report, according to the reporting period, the respective RSSIs to the base station.

10. The apparatus of claim 9, wherein the one or more measurement windows comprise time intervals when the wide-band measurements are performed regardless of transmission by the base station over the one or more frequency channels.

11. The apparatus of claim 9, wherein the configuration comprises one or more of a discontinuous reception (DRX) cycle for the UE, a measurement timing configuration indicating timing for the one or more measurement windows, or a discovery reference signal (DRS) configuration for a cell.

12. The apparatus of claim 9, wherein the instructions are further executable by the processor to cause the apparatus to:
measure one or more of a total power received across a bandwidth of a serving cell or a total power received across a bandwidth of a candidate frequency channel of the one or more frequency channels not currently used for communication to the UE.

13. The apparatus of claim 9, wherein the instructions are further executable by the processor to cause the apparatus to:
identify a reporting event comprising one or more of a wide-band received power measurement for a serving cell of the base station being greater than a first threshold, the wide-band received power measurement for the serving cell being less than a second threshold, a wide-band received power measurement for a candidate frequency channel of the one or more frequency channels not currently used for communication by the base station being less than a third threshold, or the wide-band received power measurement for the candidate frequency channel plus an offset being less than the wide-band received power measurement for the serving cell.

14. The apparatus of claim 9, wherein the configuration for reporting the RSSI comprises an indication of a set of resources for performing the wide-band measurements.

15. The apparatus of claim 9, wherein the one or more frequency channels include one or more candidate frequency channels not currently used for communication by the base station.

16. A method of wireless communication, comprising:
transmitting, by a base station, respective configurations to one or more user equipments (UEs) for reporting received signal strength indicator (RSSI) for channel selection assistance for one or more frequency channels, wherein each of the respective configurations comprises one or more measurement windows for performing measurements of RSSI on the one or more corresponding frequency channels and a reporting period for reporting the measurements of RSSI;
receiving, from the one or more UEs during the reporting period, RSSIs measured according to the one or more measurement windows, wherein the RSSIs are based at least in part on wide-band power received by the one or more UEs comprising a total co-channel interference for the one or more frequency channels; and
identifying a frequency channel for a secondary cell of the base station based at least in part on the RSSIs.

17. The method of claim 16, wherein the one or more frequency channels were not assigned as serving cells of the base station prior to identifying the frequency channel for the secondary cell.

18. The method of claim 16, further comprising:
determining base station wide-band received power information by measuring power for the one or more frequency channels; and
identifying the frequency channel for the secondary cell of the base station based at least in part on the base station wide-band received power information.

19. The method of claim 18, wherein the one or more UEs comprise a plurality of UEs being served by a primary cell of the base station, and wherein the identifying the frequency channel for the secondary cell comprises determining a frequency channel having a lowest combined interference level based at least in part on the base station wide-band received power information and the received RSSIs.

20. The method of claim 16, wherein each of the respective configurations comprises one or more of a discontinuous reception (DRX) cycle for the one or more UEs, a measurement timing configuration indicating timing for the one or more measurement windows for the one or more frequency channels, or a discovery reference signal (DRS) configuration for the one or more frequency channels.

21. The method of claim 16, wherein transmitting the respective configurations comprises sending, to the one or more UEs, any of frequency information identifying a candidate frequency channel of an unlicensed frequency band not currently used for communication by the base station, an RSSI reporting period, a filter coefficient for filtering measured wide-band received power to obtain RSSIs, or a combination thereof.

22. The method of claim 16, wherein the one or more frequency channels comprise one or more candidate frequency channels of an unlicensed frequency band not currently used for communication by the base station.

23. An apparatus for wireless communication, comprising:
   a processor;
   memory in electronic communication with the processor; and
   instructions stored in the memory and operable, when executed by the processor, to cause the apparatus to:
   transmit, by a base station, respective configurations to one or more user equipments (UEs) for reporting received signal strength indicator (RSSI) for channel selection assistance for one or more frequency channels, wherein each of the respective configurations comprises one or more measurement windows for performing measurements of RSSI on the one or more corresponding frequency channels and a reporting period for reporting the measurements of RSSI;
   receive, from the one or more UEs during the reporting period, RSSIs measured according to the one or more measurement windows, wherein the RSSIs are based at least in part on wide-band power received by the one or more UEs comprising a total co-channel interference for the one or more frequency channels; and identify a frequency channel for a secondary cell of the base station based at least in part on the RSSIs.

24. The apparatus of claim 23, wherein the one or more frequency channels were not assigned as serving cells of the base station prior to identifying the frequency channel for the secondary cell.

25. The apparatus of claim 23, wherein the instructions are further executable by the processor to cause the apparatus to:
   determine base station wide-band received power information by measuring power for the one or more frequency channels; and
   identify the frequency channel for the secondary cell of the base station based at least in part on the base station wide-band received power information.

26. The apparatus of claim 25, wherein the one or more UEs comprise a plurality of UEs being served by a primary cell of the base station, and wherein the identifying the frequency channel for the secondary cell comprises determining a frequency channel having a lowest combined interference level based at least in part on the base station wide-band received power information and the received RSSIs.

27. The apparatus of claim 23, wherein the instructions are further executable by the processor to:
   silence transmission on the one or more frequency channels for the one or more measurement windows.

28. The apparatus of claim 23, wherein each of the respective configurations comprises one or more of a discontinuous reception (DRX) cycle for the one or more UEs, a measurement timing configuration indicating timing for the one or more measurement windows for the one or more frequency channels, or a discovery reference signal (DRS) configuration for the one or more frequency channels.

29. The apparatus of claim 23, wherein the instructions are further executable by the processor to cause the apparatus to:
   send, to the one or more UEs, any of frequency information identifying a candidate frequency channel of an unlicensed frequency band not currently used for communication by the base station, an RSSI reporting period, a filter coefficient for filtering measured wide-band received power to obtain RSSIs, or combinations thereof.

30. The apparatus of claim 23, wherein the one or more frequency channels comprise one or more candidate frequency channels of an unlicensed frequency band not currently used for communication by the base station.

31. An apparatus for wireless communication, comprising:
   means for identifying, at a user equipment (UE), a configuration for reporting a received signal strength indicator (RSSI) for channel selection assistance to a base station, wherein the configuration comprises a reporting period and one or more measurement windows for performing measurements on one or more corresponding frequency channels;
   means for performing wide-band measurements of received power for the one or more frequency channels during the one or more measurement windows, the measured received power for each of the one or more frequency channels comprising a total co-channel interference over each of the one or more frequency channels;
   means for filtering the wide-band measurements to obtain respective RSSIs for the one or more frequency channels; and
   means for reporting, according to the reporting period, the respective RSSIs to the base station.

32. The apparatus of claim 31, wherein the one or more measurement windows comprise time intervals when the wide-band measurements are performed regardless of transmission by the base station over the one or more frequency channels.

33. The apparatus of claim 31, wherein the configuration comprises one or more of a discontinuous reception (DRX) cycle for the UE, a measurement timing configuration indicating timing for the one or more measurement windows, or a discovery reference signal (DRS) configuration for a cell.

34. The apparatus of claim 31, wherein the performing the wide-band measurements for the one or more frequency channels during the one or more measurement windows comprises measuring one or more of a total power received across a bandwidth of a serving cell, or a total power received across a bandwidth of a candidate frequency channel of the one or more frequency channels not currently used for communication to the UE.

35. The apparatus of claim 31, further comprising:
   means for identifying a reporting event comprising one or more of a wide-band received power measurement for a serving cell of the base station being greater than a first threshold, the wide-band received power measurement for the serving cell being less than a second threshold, a wide-band received power measurement for a candidate frequency channel of the one or more frequency channels not currently used for communication by the base station being less than a third threshold, or the wide-band received power measurement for the candidate frequency channel plus an offset being less than the wide-band received power measurement for the serving cell; and means for reporting, based at least in part on identifying the reporting event, the respective RSSIs to the base station.

36. The apparatus of claim 31, wherein the configuration for reporting the RSSI comprises an indication of a set of resources for performing the wide-band measurements.

37. The apparatus of claim 31, wherein the one or more frequency channels comprise one or more candidate frequency channels not currently used for communication by the base station.

38. The apparatus of claim 31, wherein the one or more frequency channels comprise one or more channels of an unlicensed frequency band.

39. An apparatus for wireless communication, comprising:

means for transmitting, by a base station, respective configurations to one or more user equipments (UEs) for reporting received signal strength indicator (RSSI) for channel selection assistance for one or more frequency channels, wherein each of the respective configurations comprises a reporting period and one or more measurement windows for performing measurements on the one or more corresponding frequency channels;

means for receiving, from the one or more UEs during the reporting period, RSSIs measured according to the one or more measurement windows, wherein the RSSIs are based at least in part on wide-band power received by the one or more UEs comprising a total co-channel interference for the one or more frequency channels; and means for identifying a frequency channel for a secondary cell of the base station based at least in part on the RSSIs.

40. The apparatus of claim 39, wherein the one or more frequency channels were not assigned as serving cells of the base station prior to identifying the frequency channel for the secondary cell.

41. The apparatus of claim 39, further comprising:

means for determining base station wide-band received power information by measuring power for the one or more frequency channels; and means for identifying the frequency channel for the secondary cell of the base station based at least in part on the base station wide-band received power information.

42. The apparatus of claim 41, wherein the one or more UEs comprise a plurality of UEs being served by a primary cell of the base station, and wherein the identifying the frequency channel for the secondary cell comprises determining a frequency channel having a lowest combined interference level based at least in part on the base station wide-band received power information and the received RSSIs.

43. The apparatus of claim 39, wherein each of the respective configurations comprises one or more of a discontinuous reception (DRX) cycle for the one or more UEs, a measurement timing configuration indicating timing for the one or more measurement windows for the one or more frequency channels, or a discovery reference signal (DRS) configuration for the one or more frequency channels.

44. The apparatus of claim 39, wherein:

means for transmitting the respective configurations comprises sending, to the one or more UEs, any of frequency information identifying a candidate frequency channel of an unlicensed frequency band not currently used for communication by the base station, an RSSI reporting period, a filter coefficient for filtering measured wide-band received power to obtain RSSIs, or a combination thereof.

45. The apparatus of claim 39, wherein the one or more frequency channels comprise one or more candidate frequency channels of an unlicensed frequency band not currently used for communication by the base station.

46. A non-transitory computer-readable medium storing code for wireless communication, the code comprising instructions executable by a processor to:

identify, at a user equipment (UE), a configuration for reporting a received signal strength indicator (RSSI) for channel selection assistance to a base station, wherein the configuration comprises a reporting period and one or more measurement windows for performing measurements on one or more corresponding frequency channels;

perform wide-band measurements of received power for the one or more frequency channels during the one or more measurement windows, the measured received power for each of the one or more frequency channels comprising a total co-channel interference over each of the one or more frequency channels;

filter the wide-band measurements to obtain respective RSSIs for the one or more frequency channels; and report, according to the reporting period, the respective RSSIs to the base station.

47. A non-transitory computer-readable medium storing code for wireless communication, the code comprising instructions executable by a processor to:

transmit, by a base station, respective configurations to one or more user equipments (UEs) for reporting received signal strength indicator (RSSI) for channel selection assistance for one or more frequency channels, wherein each of the respective configurations comprises a reporting period and one or more measurement windows for performing measurements on the one or more corresponding frequency channels;

receive, from the one or more UEs during the reporting period, RSSIs measured according to the one or more measurement windows, wherein the RSSIs are based at least in part on wide-band power received by the one or more UEs comprising a total co-channel interference for the one or more frequency channels; and identify a frequency channel for a secondary cell of the base station based at least in part on the RSSIs.

* * * * *